US012228251B2

(12) United States Patent
Baker et al.

(10) Patent No.: US 12,228,251 B2
(45) **Date of Patent: *Feb. 18, 2025**

(54) GAS CONTROL SYSTEM

(71) Applicant: MARLIN GAS SERVICES, LLC, Spring Hill, FL (US)

(72) Inventors: Kenneth Lynn Baker, Tarpon Springs, FL (US); Paul Sydney Richards, Lady Lake, FL (US)

(73) Assignee: Marlin Gas Services, LLC, Spring Hill, FL (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/838,203

(22) Filed: Jun. 11, 2022

(65) Prior Publication Data

US 2022/0364681 A1 Nov. 17, 2022

Related U.S. Application Data

(63) Continuation of application No. 17/360,800, filed on Jun. 28, 2021, now Pat. No. 11,359,767, which is a (Continued)

(51) Int. Cl.

*F17C 5/06* (2006.01)
*F17C 13/02* (2006.01)
*F17C 13/04* (2006.01)

(52) U.S. Cl.

CPC .............. *F17C 13/025* (2013.01); *F17C 5/06* (2013.01); *F17C 13/04* (2013.01); (Continued)

(58) Field of Classification Search

CPC .......... F17C 13/025; F17C 5/06; F17C 13/04; F17C 2221/0123; F17C 2223/0123; (Continued)

(56) References Cited

U.S. PATENT DOCUMENTS 3,755,225 A * 8/1973 Pierce, Jr. ............... C08F 14/06 526/204
6,810,925 B2 * 11/2004 Graham .................... F17C 9/00 141/98

(Continued)

OTHER PUBLICATIONS

Afful, Christopher. Non-Final Office Action, U.S. Appl. No. 16/914,394, filed Jul. 25, 2022. pp. 1-53. United States Patent and Trademark Office. USA.

(Continued)

*Primary Examiner* — David Colon-Morales
*Assistant Examiner* — Stephanie A Shrieves

(57) ABSTRACT

An apparatus that allows for the distribution of gas from one or more high-pressure tanks into a gas supply system that includes multiple controllers, multiple piping sections, a high-pressure accumulator, a mid-pressure accumulator, a compressor, one or more valves, one or more indirect heaters, and pressure gauges. The controllers controlling the gas supply within the gas supply system and determining which group of valves should provide distribution and control of gas. The gas supply system provides 100% redundancy between one set of valves and the controller and another set of valves and another controller.

19 Claims, 10 Drawing Sheets

Related U.S. Application Data continuation-in-part of application No. 16/914,394, filed on Jun. 28, 2020, now Pat. No. 11,629,859.

(52) U.S. Cl.
CPC .............................. *F17C 2221/033* (2013.01); *F17C 2223/0123* (2013.01); *F17C 2225/0123* (2013.01); *F17C 2250/043* (2013.01)

(58) Field of Classification Search
CPC ........ F17C 2225/0123; F17C 2250/043; F17C 2205/0326; F17C 2225/035; F17C 2227/0157; F17C 2227/0302; F17C 2227/0388; F17C 2250/032; F17C 2250/034; F17C 7/00
USPC .............................................................. 141/4
See application file for complete search history.

(56) References Cited

U.S. PATENT DOCUMENTS

| | | | | |
|---|---|---|---|---|
| 7,559,213 | B2 * | 7/2009 | Allam | F25J 1/0224 62/607 |
| 10,202,976 | B2 | 2/2019 | Bielefeldt | |
| 2003/0192609 | A1 | 10/2003 | Enerson | |
| 2012/0205003 | A1 * | 8/2012 | Okawachi, I | F17C 5/00 141/95 |
| 2012/0298256 | A1 * | 11/2012 | Mori | F17C 13/02 141/94 |
| 2014/0272671 | A1 * | 9/2014 | Handa | B60L 3/12 429/515 |
| 2016/0258578 | A1 * | 9/2016 | Vega Perez | F16L 25/00 |
| 2017/0146001 | A1 * | 5/2017 | Nagura | F04B 35/04 |
| 2018/0205102 | A1 * | 7/2018 | O'Brien | H01M 8/04201 |
| 2019/0128205 | A1 * | 5/2019 | Eckerdal | F17C 13/002 |
| 2020/0164840 | A1 * | 5/2020 | Smith | B60S 5/02 |

OTHER PUBLICATIONS

Afful, Christopher. Non-Final Office Action, U.S. Appl. No. 17/360,766, filed Jul. 25, 2022. pp. 1-54. United States Patent and Trademark Office. USA.

* cited by examiner

GAS CONTROL SYSTEM

BACKGROUND

Natural gas end-users occasionally use high-pressure tankers to provide natural gas into their system. This will happen when there is a shortage of natural gas within the system to meet the demand or the end-user does not have a connection to an existing pipeline. Commercially, high-pressure natural gas tankers operate at pressures over 4,000 PSIG when initially filled and become depleted with lower pressure (e.g., less than 100 PSIG) when natural gas is supplied to the end-user. The actual supply pressure depends on the end user's requirements. Existing systems do not provide an efficient and safe control system with 100% redundancy while also ensuring lower costs.

DETAILED DESCRIPTION OF PREFERRED EMBODIMENTS

Figure 1:
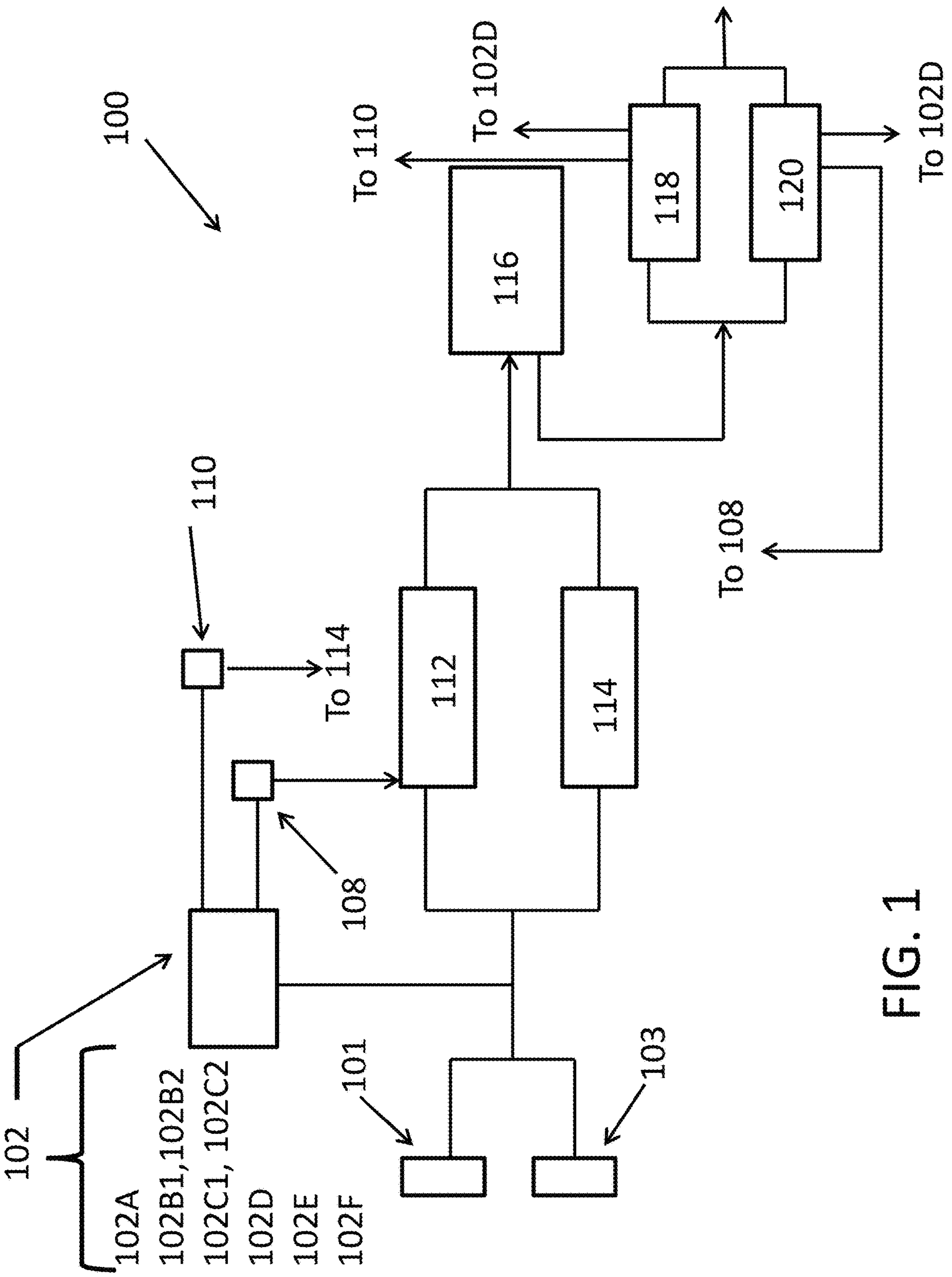
FIG. 1 is a diagram of an example environment in which systems and/or methods described herein may be implemented.

The following detailed description refers to the accompanying drawings. The same reference numbers in different drawings may identify the same or similar elements. Systems, devices, and/or methods described herein may allow for a gas supply system that provides control mechanisms as well as 100% redundancy to one or more sub-systems within the gas supply system. In embodiments, the gas supply system uses one or more high-pressure tanks that discharge gas through a gas supply system that includes one or more groups of valves, control valves, safety valves, and/or monitor valves that have 100% redundancy with other groups of valves, control valves, safety valves, and/or monitor valves. In embodiments, the gas supply system discharges natural gas to an end-user system (e.g., a hospital, natural gas utility, a customer without a direct connection to the pipeline, etc.).

In embodiments, the pressure in the one or more tanks may be rated at a maximum pounds per square inch gauge (PSIG) based on the construction and type of tank that is being used and the tank's certification capability for receiving and transporting a type of gas within the tanks (e.g., natural gas or another gas, such as nitrogen, hydrogen, biogas, etc.). In embodiments, the natural gas is being delivered at a particular pressure and/or flow rate through the piping system pressure for delivery of gas to an end-user (e.g., a natural gas utility, a commercial user of natural gas, etc.).

In embodiments, one or more pressure gauges may electronically (e.g., via wireless, satellite, Internet, Intranet systems) send electronic information about the gas pressure to one more computing devices that monitor the natural gas being distributed within the one or more piping sections. In embodiments, the one or more computing devices may determine, based on the electronic information about pressure, that a changeover is to occur between one or more redundant groups of valves, control valves, safety valves, and/or monitor valves. In embodiments, the one or more types of valves may be manually (e.g., mechanically) controlled and the changeover between different groups of valves, control valves, safety valves, and/or monitor valves is to occur manually. Additionally and/or alternatively, the one or more types of valves may be controlled electronically by one or more computing devices. In embodiments, the one or more computing devices may electronically communicate with one or more valves, control valves, and/or other types of valves to either open or close depending on which groups of valves are required. Furthermore, a computing device may determine which of one or more tanks (individually or in combination) should provide natural gas into the gas supply system.

Accordingly, a system may allow for (1) distribution of gas from one or more high-pressure tanks into a gas supply system that includes one or more piping sections and one or more valves, control valves, non-reversible valves, pressure gauges, temperature gauges, and/or flow rate gages; (2) controlling gas supply within the gas supply system; (3) determining which group of valves should provide distribution and control of gas; (4) lower costs; and (5) 100% redundancy between one set of valves and controller and another set of valves and another controller.

FIG. 1 is a schematic diagram of an example system 100 in which systems, devices, and/or methods described herein may be implemented. As shown in FIG. 1, system 100 includes tank 101, tank 103, system 102, controller 108, controller 110, system 112, system 114, heater 116, system 118, and system 120. In embodiments, tanks 101 and 103 may be high-pressure tanks that contain natural gas. In embodiments, tanks 101 and 103 may each hold natural gas at a pressure rating of 5,000 PSIG. In this example, systems 112, 114, 118, and 120 are sub-systems of system 100 with each sub-system including different types of valves (e.g., control valves, fail-close valves, etc.), pressure gauges, and/or flow rate gauges. In this example, one or more sub-systems of system 100 may communicate electronic information (via pressure gauges, flow rate gauges, etc.) about pressure and/or flowrate information to a computing device (e.g., device 406).

In a non-limiting example, tank 101 is providing natural-gas into system 100, which does not contain any natural gas. In this non-limiting example, tank 101 sends natural gas to both system 102 and system 112. System 112 may include a control valve that prevents natural gas from being sent beyond system 112 until a control indicator (e.g., control gas which provides control pressure information) is received from system 102. In embodiments, system 102 may consist of accumulators and valves that provide a conditioned gas stream (e.g., gas flowing at a particular pressure) which then provides motive power (e.g., actuate, control, etc.) for valves that are located in other systems. In embodiment, natural gas is delivered to high-pressure (HP) accumulator 102A, from tank 101. HP accumulator 102A pressure may vary depending upon the pressure within tank 101. Upon exiting HP accumulator 102A, the gas passes through valves 102B1 and 102B2, reducing the pressure of the natural-gas down to 200 pounds per square inch (PSIG). At the reduced pressure, the gas enters medium-pressure (MP) accumulator 102E which provides secondary storage at a stable pressure. As the gas leaves the MP accumulator 102E, it is further reduced in pressure by a valve located between system 102 and controller 108. This further reduced operating pressure provides the motive power for the valves in the other systems and is also used as reference pressure information for controller 108 to control a control valve. At this point, the control valve in system 112 is open and allows natural gas to flow through system 112

In this non-limiting example, based on the communications from controller 108, a control valve in system 112 can be closed (or opened) to manage the downstream pressure within required limits. Accordingly, the control valve in system 112 can be used to reduce the natural gas pressure being delivered from tank 101. If the natural gas pressure is reduced, there may be a drop in temperature of the natural gas. Thus, heater 116 increases the natural gas temperature within the delivery range required by the end-user. After passing through the heater 116, the natural gas is sent to system 120.

Additionally, before the natural gas is sent to system 120, a small proportion of the natural gas is diverted to valve 102D. In this non-limiting example, valve 102D reduces the natural gas pressure and replaces the natural gas that enters system 102 from HP accumulator 102A, valve 102B1, and valve 102B2. Thus, valve 102D now sends the natural gas required to operate controller 108 (which controls a control valve in system 112) by providing a reference pressure for controller 108 to operate, and also provide gas for the operation of a fail-close valve. Based on the temperature within system 102, heater 102F (which may be a catalytic heater) may operate using natural-gas diverted from a piping section after heater 116.

In addition, natural gas is also sent from a piping section between heater 116 and system 120 to provide pressure information to controller 108. Based on controller 108 comparing this downstream pressure information with the reference pressure information, controller 108 may make adjustments to the control valve in system 112 to control the amount of gas flow (based on an operator-adjusted set point). If a large surge of natural gas enters the system and the pressure rises rapidly, due to the control valve in system 112 being too slow to respond, then the pressure information will also be sent to another valve within system 102. If the pressure is not within bounds of the operator-adjusted set point, this other valve within system 102 will stop the flow of gas to the fail-close valve and prevent any additional natural gas from entering the system.

In another non-limiting example, tank 103 is providing natural gas into system 100, which does not contain any natural gas. In this non-limiting example, tank 103 sends natural gas to both system 102 and system 114. System 114 may include a control valve that prevents natural-gas from being sent beyond system 114 until control gas is received from system 102. In embodiments, system 102 may consist of accumulators and valves that provide a conditioned gas stream which then provides motive power for valves that are located in other systems. In embodiment, natural gas is delivered to high-pressure (HP) accumulator 102A, from tank 103. HP accumulator 102A pressure may vary depending upon the pressure within tank 101. Upon exiting HP accumulator 102A, the gas pass through valves 102C1 and 102C2, reducing the pressure of the natural-gas down to 200 pounds per square inch (PSIG). At the reduced pressure, the gas enters MP accumulator 102E and provides secondary storage at a stable pressure. As the gas leaves MP accumulator 102E, it is further reduced in pressure by a valve (not shown) located between system 102 and controller 110. This further reduced operating pressure provides the motive power for the valves in the other systems and is also used as reference pressure information for controller 110 to control a control valve. At this point, the control valve in system 114 is open and allows natural gas to flow through system 114.

In this non-limiting example, based on the communications from the controller 110, a control valve in system 114 will close to manage the downstream pressure within the required limits. Accordingly, a control valve in system 114 can be used to reduce the natural gas pressure being delivered from tank 103. If the natural gas pressure is reduced, there may be a drop in temperature of the natural gas. Accordingly, heater 116 increases the natural gas temperature within the delivery range required by the end-user. After passing through the heater 116, the natural gas is sent to system 118.

Additionally, before the natural gas is sent to system 118, a small proportion of the gas is diverted to valve 102D. In this non-limiting example, valve 102D reduces the natural gas pressure and replaces the natural gas that enters system 102 from HP accumulator 102A, valve 102C1, and valve 102C2. Thus valve 102D now sends the natural gas required to operate controller 110 (which controls a control valve in system 114) and also provide gas for the operation of the fail-close valve. Based on the temperature within system 102, heater 102F (which may be a catalytic heater) may operate using natural-gas diverted from a piping section after heater 116.

In addition, natural gas is also sent from a piping section between heater 116 and system 118 to provide pressure information to controller 110. Based on controller 110 comparing this downstream pressure information with the reference pressure information, controller 110 may make adjustments to the control valve in system 114 to control the amount of gas flow (based on an operator-adjusted set point). If a large surge of natural gas enters the system and the pressure rises rapidly, due to the control valve in system 114 being too slow to respond, then the pressure information will also be sent to another valve within system 102. If the pressure is not within bounds of the operator-adjusted set point, this other valve within system 102 will stop the flow of gas to the fail-close valve and prevent any additional natural gas from entering the system.

While the examples use high-pressure tank 101, in the above examples, natural gas can be provided by high-pressure tank 103, or both high-pressure tank 101 and 103.

Figure 2A:
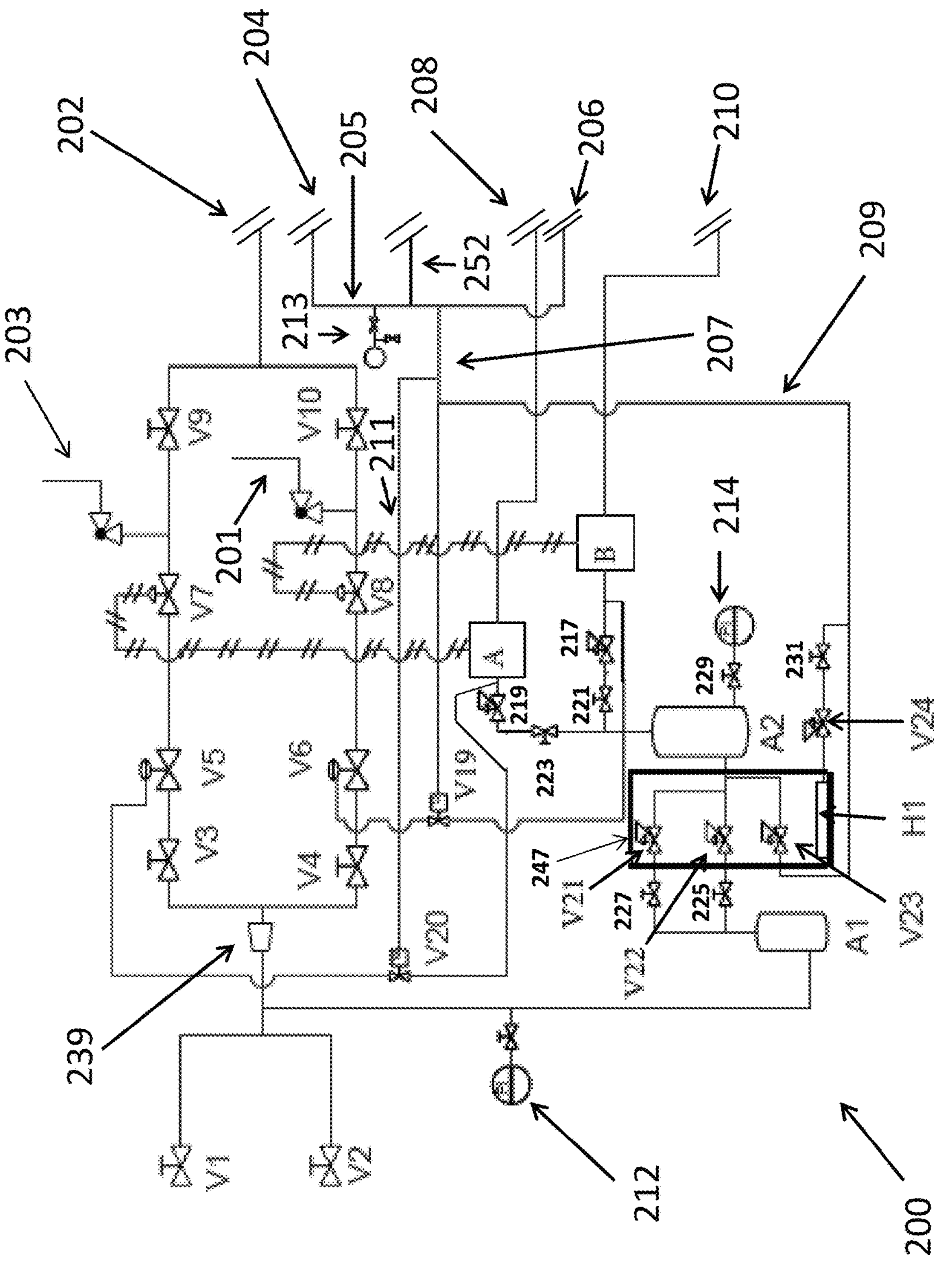
FIGS. 2A and 2B are schematic diagrams of a process.
Figure 2B:
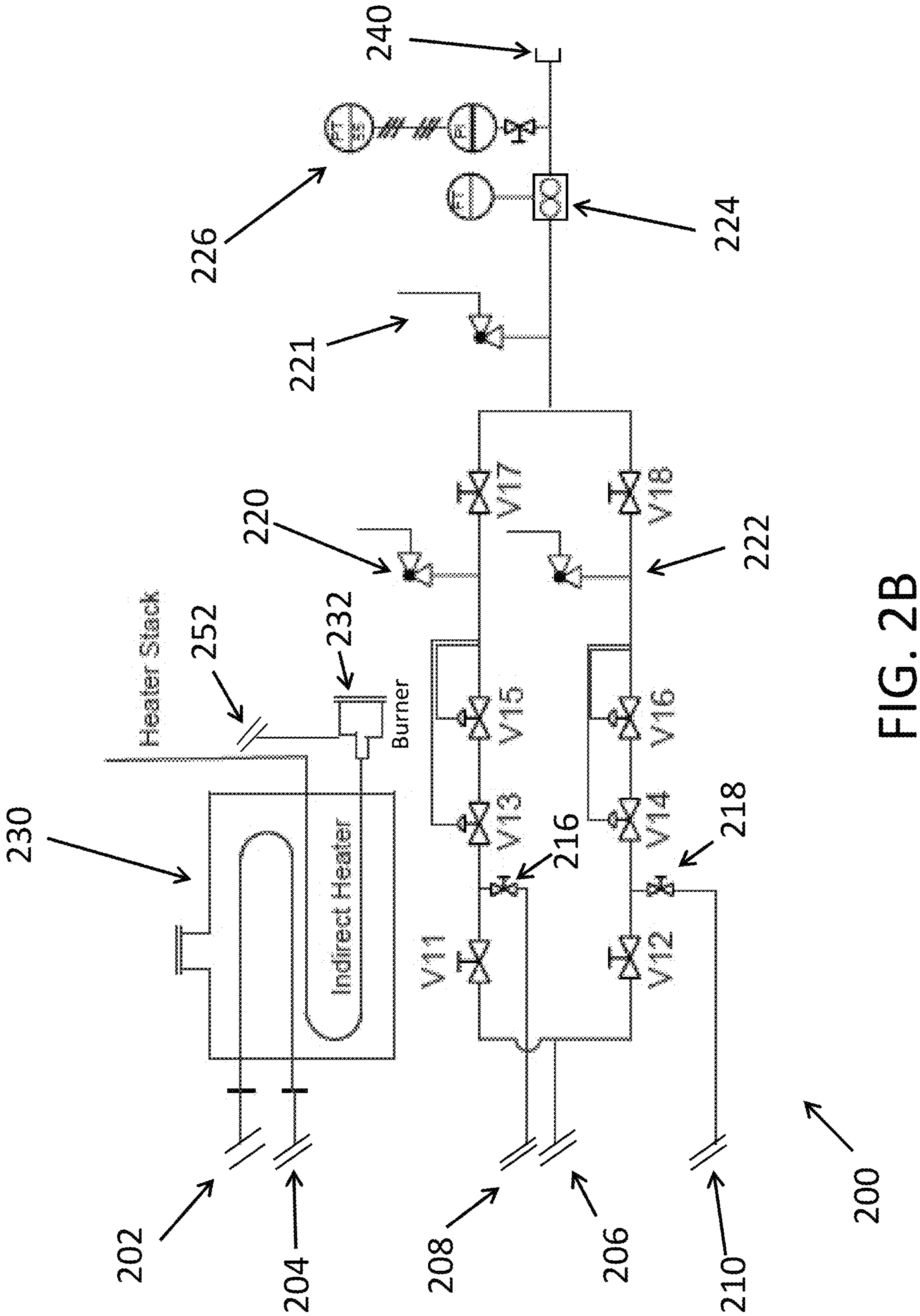

FIGS. 2A and 2B are example diagrams of a system 200 for distribution of high-pressure gas as well as control systems for the high-pressure gas. FIG. 2A shows a first portion of system 200 and FIG. 2B shows a second portion of system 200. As shown in FIGS. 2A and 2B diagonal lines ("\\") are used on piping sections 202, 204, 206, 208, 210, and 252 as they are shown across both FIGS. 2A and 2B. FIGS. 2A and 2B, in combination, show valves v1, v2, v3, v4, v5, v6, v7, v8, v9, v10, v11, v12, v13, v14, v15, v16, v17, v18, v19, v20, v21, v22, v23, and v24. In addition, FIG. 2A shows pipe expansion 239, heater H1 (e.g., a catalytic heater), high-pressure (HP) accumulator tank A1, medium-pressure (MP) accumulator tank A2, pressure safety valve 201, pressure safety valve 203, pressure gauges 212, 213, and 214, controller A, controller B, and piping sections 202, 204, 206, 207, 208, 209, 210, 211, and 252. FIG. 2A also shows valves 217, 219, 221, 223, 225, 227, 229, and 231. Furthermore, FIG. 2B shows piping sections 202, 204, 206, 208, 210, and 252. FIG. 2B also shows indirect heater 230, burner 232, valve 216, valve 218, pressure safety valve 220, and pressure safety valve 222, flow rate reader 224, and pressure reader 226. In embodiments, any of the valves described in FIGS. 2A and 2B may be opened and closed either (1) mechanically (e.g., manually), (2) pneumatically, (3) electrically, or (4) electronically based on electronic communications (e.g., wired and/or wireless from a computing device, such as device 406 described in FIG. 4). In FIGS. 2A and 2B, controller A, valves v3, v5, v7, v9, v11, v13, v15, and v17 provide for 100% redundancy of controller B, valves v4, v6, v8, v10, v12, v14, v16, and v18 (and vice versa). Thus, for example, if there is a problem with valve v11 (e.g., based on pressure readings in system 200), then a changeover will be conducted to use controller B, valves v4, v6, v8, v10, v12, v14, v16, and v18. Also, for example, if there is a problem with valve v8 (based on pressure readings in system 200, a failure of the valve, etc.), then a changeover will be conducted to use controller A, valves v3, v5, v7, v9, v11, v13, v15, and v17. Furthermore, piping sections are shown in FIGS. 2A and 2B that may not be numbered but may be described based on their location to other features, such as controllers, valves, pressure gauges, accumulators, pressure safety valves, etc. In embodiments, controller A may be a pneumatic, electric, hydraulic, electrohydraulic, or an electro-pneumatic controller. In embodiments, controller B may be a pneumatic, electric, hydraulic, electrohydraulic, or an electro-pneumatic controller. In embodiments, as shown in FIG. 2A, depending on the type of controller and the type of valve, the line between controller A and v7 may be a pneumatic line, hydraulic line, electric line, or any other line that can provide motive power (e.g., actuate, control, etc.) to v7. In embodiments, as shown in FIG. 2A, depending on the type of controller and the type of valve, the line between controller B and v8 may be a pneumatic line, hydraulic line, electric line, or any other line that can provide motive power (e.g., actuate, control, etc.) to v8. While A1 may be a HP accumulator, A1 in other examples may be any other type of pressure accumulator. While A2 may be MP accumulator, A2 in other examples may be any other type of pressure accumulator.

In a non-limiting example, natural gas is received through v1 from a high-pressure tank. In embodiments, v1 (and v2) can be opened manually or electronically via electronic communications (e.g., wired, wirelessly, etc.). However, natural gas can also be provided through v2 or a combination of two tanks from both v1 and v2. In this non-limiting example, there is no natural gas in the system until (1) natural gas is sent to v3 and/or v4, and (2) natural gas is sent through v1 and passes to high-pressure accumulator tank A1. In embodiments, the piping diameter after v1 and v2, and before pipe expansion 239, is smaller than the piping diameter of the piping after pipe expansion 239. For example, piping up to pipe expansion 239 (from v1 and v2) may be one inch in diameter while piping after pipe expansion 239 may be two inches in diameter. In embodiments, before any gas enters from any tank into any of the piping sections, v5 may be closed and v7 may be open. In embodiments, v5 may be a fail-close valve.

In embodiments, the pressure within tank A1 (a HP accumulator) may vary following the pressure within tanks 101 or 103. In embodiments, tank A1 holds a small volume of natural gas to dampen any pressure variations that may occur within the mainline (e.g. one or more piping sections). Upon exiting tank A1, the natural gas is then sent to v21 via valve 227 and/or v22 via valve 225. As the natural gas passes through v21 and/or v22 the pressure is reduced (e.g., from 1000 PSIG to 200 PSIG) and the natural gas is sent to tank A2 (a MP accumulator). In embodiments, v21, v22, v23, and H1, may be located in a cabinet 247. In embodiments, tank A2 contains a modest volume (e.g., less than 50 liters) of natural gas to further reduce any effects of pressure variations that may occur within the piping sections.

After leaving tank A2, the natural gas then passes through valves 223 and 219, the pressure is further reduced to an operating pressure (e.g., 20 PSIG). In addition, the natural gas is delivered via valve 229 to pressure gauge 214. In embodiments, the pressure reading by pressure gauge 214 provides information (e.g., viewed locally or sent via electronic communications to another device) about whether the amount of natural gas in A2 is below a particular threshold level. At any time, in this or any other non-limiting example, if the pressure information read by pressure gauge 214 is below the particular threshold, this may indicate that there is not enough natural gas in a high-pressure tank and that the tank should be replaced. A portion of the natural gas exiting valve 219 at the final operating pressure is sent to v20, which is an inverse acting valve. Since v20 is receiving low-pressure information regarding the natural gas, v20 will be fully open. This will allow the natural gas to proceed and pass through v5. At this point, v5 (which is a fail-close valve) is opened based on the fully-open position of v20. In addition, pressure information (e.g., pressure reference information) of the natural gas exiting tank A2 may be used by controller A (via valve 223 and then valve 219) to control valve v7 at a later time. However, at this particular time, in this non-limiting example, v7 is currently open and allows gas now passing through v5 to continue to flow.

In between v7 and v9, a pressure safety valve 203 is provided to prevent a pressure build-up from occurring between v7 and v9. Once the natural gas passes v9, the natural gas enters piping section 202. The natural gas flows through piping section 202 and then enter indirect heater 230 (e.g., a water bath heater) as shown in FIG. 2B. Within indirect heater 230, the natural gas is heated, indirectly, to maintain a temperature level. In embodiments, indirect heater 230 contains water which is heated by burner 232 (e.g., a natural gas burner) and uses the heated water via a heat exchange to heat the natural gas as that enters through piping section 202.

As shown in FIG. 2A, piping section 252, located after pressure gauge 213, may send natural gas to one or more accumulators and valves (not shown in FIG. 2A) which will reduce the natural gas pressure. The natural gas with reduced pressure is then transmitted via piping section 252 to burner 232 (as shown in FIG. 2B) which then maintains the flame within the fire tube (of heater 230) and continues to heat the water contained in heater 230.

Thus, the natural gas exits indirect heater 230 and enters piping section 204. The natural gas passes from piping section 204 into piping section 205 (as shown in FIG. 2A), piping section 206 (shown in FIG. 2A), and then enters valve v11 (as shown in FIG. 2B). The natural gas then passes through monitor valves v13 and v15. In embodiments, monitor v13 is an inactive monitor valve that is only used if there is a problem with active monitor valve v15. For example, inactive monitor valve v13 may actuate at a pressure level of 55 PSIG while active monitor valve v15 may operate at a pressure level of 50 PSIG. If there is a problem with v15, then v13 will take over. In embodiments, v13 operates at a higher pressure and will remain in the open position. If v15 fails, then the pressure level will be higher than the required pressure level and, thus, v13 will operate as there is now a higher pressure in that piping section. After monitor valve v15, a pressure safety valve 220 is provided. If there are no problems with pressure, the natural gas passes through v17 and passes by pressure safety valve 221. Flow rate reader 224 reads the flow amount and device 226 is a pressure gage and pressure transmitter which sends pressure information to a computing device (e.g., device 406) to determine whether a sufficient amount of natural gas is being delivered to gas system 240 (e.g., an end-user system or another system).

In this non-limiting example, when natural gas enters piping section 205, the natural gas may also follow piping section 207 and then piping section 209. The natural gas entering piping section 209 is sent to heater H1 (via valve 231) and valve v23. The natural gas sent to v23 is then sent to mid-pressure accumulator tank A2. This natural gas is then used to provide reference pressure information to controller A. Thus, controller A no longer requires natural gas (and the natural gas pressure information) via A1, V21 and/or V22 which are only used to provide the initial pressure needed for controller A to operate the first time. In this non-limiting example, the natural gas pressure exiting v23 is at a higher pressure than the natural gas that is exiting v21 and/or v22 from high-pressure accumulator A1. Thus, the pressure from v23 back-pressurizes and prevents gas from v21 and/or v22 from proceeding any further. Thus, the gas passes from v23 and then enters mid-pressure accumulator A2.

In addition, the natural gas that enters piping section 207 also enters piping section 211. The gas from piping section 211 goes to v20 and provides gas pressure information to v20. If this pressure (provided in the gas pressure information) is above a prescribed level (e.g., an operator adjustable set point), v20 will close and shut off the natural gas required to operate v5 (as v5 is a fail-close valve). Thus, v5 will close and prevent the pressure within the pipeline increasing beyond this prescribed level and may also prevent any safety valves from opening and allowing natural gas to be emitted to the atmosphere.

In this non-limiting example, when gas enters v11, a portion of gas is sent through valve 216 and natural gas is sent through piping section 208 to controller A. In this non-limiting example, controller A receives downstream natural gas pressure information from the natural gas sent through piping section 208. Based on comparing downstream natural gas pressure information with the reference pressure information (received via valve 219), controller A controls v7 to determine how much natural gas (as long as natural gas is flowing through v5) should flow through v7.

In another non-limiting example, natural gas is received through v1 from a high-pressure tank. In embodiments, v1 (and v2) can be opened manually or electronically via electronic communications (e.g., wired, wirelessly, etc.). However, natural gas can also be provided through v2 or a combination of two tanks from both v1 and v2. In this non-limiting example, there is no natural gas in the system until (1) natural gas is sent to v3 and/or v4, and (2) natural gas is sent through v1 and passes to high-pressure accumulator tank A1. In embodiments, the piping diameter after v1 and v2, and before pipe expansion 239, is smaller than the piping diameter of the piping after piping expansion 239. For example, piping up to pipe expansion 239 (from v1 and v2) may be one inch in diameter while piping after pipe expansion 239 may be two inches in diameter.

In embodiments, the pressure within tank A1 (a HP accumulator) may vary following the pressure within tanks 101 or 103. In embodiments, tank A1 holds a small volume to natural gas to dampen any pressure variations that may occur within the mainline (e.g., one or more piping sections). Upon exiting tank A1, the natural gas is then sent to v21 via valve 227 and/or v22 via valve 225. As the natural gas passes through v21 and/or v22 the pressure is reduced (e.g., from 1000 PSIG to 200 PSIG) and the natural gas is sent to tank A2 (a MP accumulator). In embodiments, tank A2 contains a modest volume (e.g., less than 50 liters) of natural gas to further reduce any effects of pressure variations that may occur within the piping sections.

After leaving tank A2, the natural gas then passes through valves 221 and 217, the pressure is further reduced to an operating pressure (e.g., 20 PSIG). In addition, the natural gas is delivered via valve 229 to pressure gauge 214. A portion of the natural gas exiting valve 217 at the final operating pressure is sent to v19, which is an inverse acting valve. Since v19 is receiving a low-pressure communication (e.g., gas pressure information) from the mainline (e.g., one or more piping sections), v19 will be fully open. This will allow the natural gas to proceed and pass through v6. At this point, v6 (which is a fail-close valve) is opened based on the fully-open position of v19.

In addition, pressure information (e.g., pressure reference information) of natural gas exiting tank A2 may be used by controller B (via valve 221 and then valve 217) to control valve v8 at a later time. However, at this particular time, in this non-limiting example, v8 is currently open and allows gas now passing through v6 to continue to flow.

In between v8 and v10, a pressure safety valve 201 is provided to prevent a pressure build-up from occurring between v8 and v10. Once the natural gas passes v10, the natural gas enters piping section 202. The natural gas then flows through piping section 202 and then enters indirect heater 230 (e.g., a water bath heater) as shown in FIG. 2B. Within indirect heater 230, the natural gas is heated, indirectly, to maintain a temperature level. In embodiments, indirect heater 230 contains water which is heated by burner 232 (e.g., a natural gas burner) and uses the heated water via a heat exchange to heat the natural gas as that enters through piping section 202.

As shown in FIG. 2A, piping section 252, located after pressure gauge 213, may send natural gas to one or more accumulators and valves (not shown in FIG. 2A) which will reduce the natural gas pressure. The natural gas with reduced pressure is then transmitted via piping section 252 to burner 232 (as shown in FIG. 2B) which then maintains the flame within the fire tube (of heater 230) and continues to heat the water contained in heater 230.

Thus, the natural gas exits indirect heater 230 and enters piping section 204. The natural gas passes from piping section 204 into piping section 205 (as shown in FIG. 2A), piping section 206 (shown in FIG. 2A), and then enters valve v12 (as shown in FIG. 2B). The natural gas then passes through monitor valves v14 and v16. In embodiments, monitor v14 is an inactive monitor valve that is only used if there is a problem with active monitor valve v16. For example, inactive monitor valve v14 may actuate at a pressure level of 55 PSIG while active monitor valve v16 may operate at a pressure level of 50 PSIG. If there is a problem with v16, then v14 will take over. In embodiments, v14 operates at a higher pressure and will remain in the open position. If v16 fails, then the pressure level will be higher than the required pressure level and, thus, v14 will operate as there is now a higher pressure in that piping section. After monitor valve v16, a pressure safety valve 222 is provided. If there are no problems with pressure, the natural gas passes through v18 and then passes by pressure safety valve 221. Flow rate reader 224 reads the flow amount and device 226 is a pressure gage and pressure transmitter which sends pressure information to a computing device (e.g., device 406) to determine the amount of natural gas being delivered to gas system 240.

In this non-limiting example, when natural gas enters piping section 205, the natural gas may also follow piping section 207 and then piping section 209. The natural gas entering piping section 209 is sent to heater H1 (via valve 231) and valve v23. The natural gas sent to v23 is then sent to mid-pressure accumulator tank A2. The natural gas sent to v23 is then sent to mid-pressure accumulator tank A2. This natural gas is then used to provide reference pressure information to controller B. Thus, controller B no longer requires natural gas (and natural gas pressure information) via A1, V21 and/or V22 which are only used to provide the initial pressure needed for controller B to operate the first time. In this non-limiting example, the natural gas pressure exiting v23 is at a higher pressure than the natural gas that is exiting v21 and/or v22 from high-pressure accumulator A1. Thus, the pressure from v23 back-pressurizes and prevents gas from v21 and/or v22 from proceeding any further. Thus, the gas passes from v23 and then enters mid-pressure accumulator A2.

In addition, the natural gas that enters piping section 207, and goes to v19, provides gas pressure information to v19. If this pressure value (provided in the gas pressure information) is above a prescribed level (e.g., an operator adjustable set point) v19 will close and shut off the natural gas required to operate v6 (as v6 is a fail-close valve). Thus, v6 will close and prevent the pressure within the pipeline increasing beyond this prescribed level and may also prevent any safety valves from opening and allowing natural gas to be emitted to the atmosphere.

In this non-limiting example, when gas enters v12, a portion of gas is sent through valve 218 and natural gas is sent through piping section 210 to controller B. In this non-limiting example, controller B receives downstream natural gas pressure information from the natural gas sent through piping section 210. Based on comparing downstream natural gas pressure information with the reference pressure information (received via valve 217), controller B controls v8 to determine how much natural gas (as long as natural gas is flowing through v6) should flow through v8.

Figure 4:
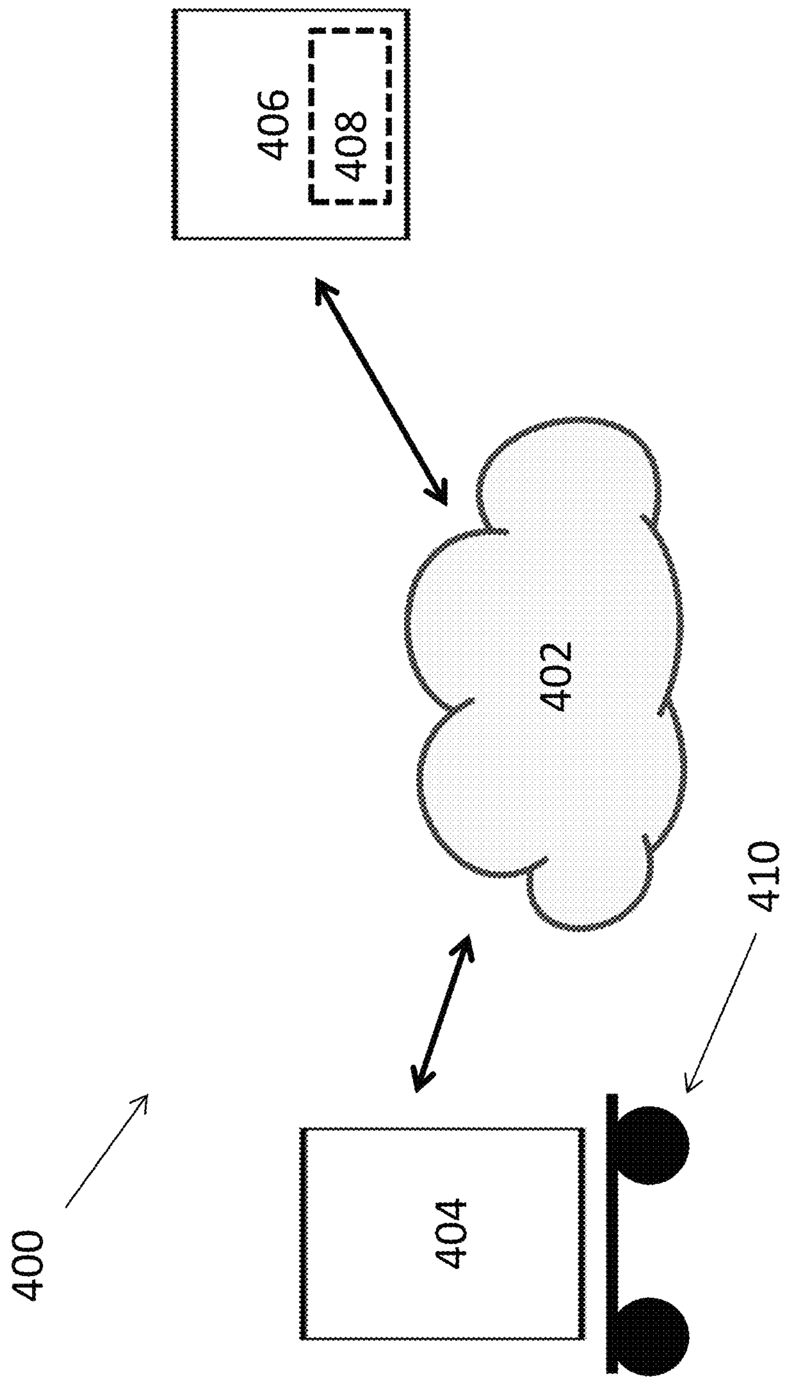
FIG. 4 is an example diagram.

In embodiments, for FIGS. 2A and 2B, device 406 (described in FIG. 4) may in communication with system 200 (e.g., system 404 described in FIG. 4). In embodiments, device 406 may receive electronic information about pressure readings in system 200 and generate messages to switch over from one set of valves to another set of valves in the event of problems occurring within the system. For example, if there is a problem with valve v4 (based on pressure readings in system 200, a failure of the valve, etc.), then device 406 may receive information about the problem (e.g., pressure reading information) and generate a message to conduct a changeover and use valves v3, v5, v7 and v9, and controller A. In embodiments, the messages may be sent to one or more valves in system 200 which are used to open or close the valves. Additionally, or alternatively, the messages may be sent to a user of system 200 who may change one or more valves in system 200 manually (e.g., mechanically). In embodiments, device 406 may be associated with a graphical user interface that includes a visual display. In embodiments, device 406 may be associated with a control panel system that includes alarms, warning lights, and/or other lighting indicators that are may be incorporated as part of the graphical user interface or are part of an analog system. Thus, a user may use the graphical user interface to view various types of information that are used to make decisions as to whether one or more valves should be opened or closed. In embodiments, based on changing requirements (e.g., pressure requirements) of natural gas supply of system 200 to an end-user, a set point for a controller (e.g., controller A, controller B, etc.) may be adjusted (e.g., electronically, manually, etc.) to accommodate any such updates. In embodiments, the set point value may be based on reference pressure information, a relationship between the reference pressure information and the downstream pressure information, or another value. In embodiments, a controller may adjust a control valve (e.g., v7) based on comparing the set point to (i) a value based on a relationship (e.g., differential, proportional, etc.) between reference pressure information and downstream pressure information, (ii) a value based on downstream pressure information, (iii) a value based on reference pressure information, or (iv) another value (e.g., end-user pressure requirements). For the examples described above for systems 100 and 200, in embodiments, a set point value for v19 may be less than, equal to, or greater than a set point value for controller A. Also, in embodiments, a set point value for v20 may be less than, equal to, or greater than s set point value for controller B. In embodiments, any set point may be adjusted based on gas pressure requirements of an end-user system. For the non-limiting examples described in FIG. 2, gas refers to natural gas. However, in other examples, other types of gases may be used, such as biogas, oxygen, reclaimed natural gas, or any other type of gas.

Figure 3:
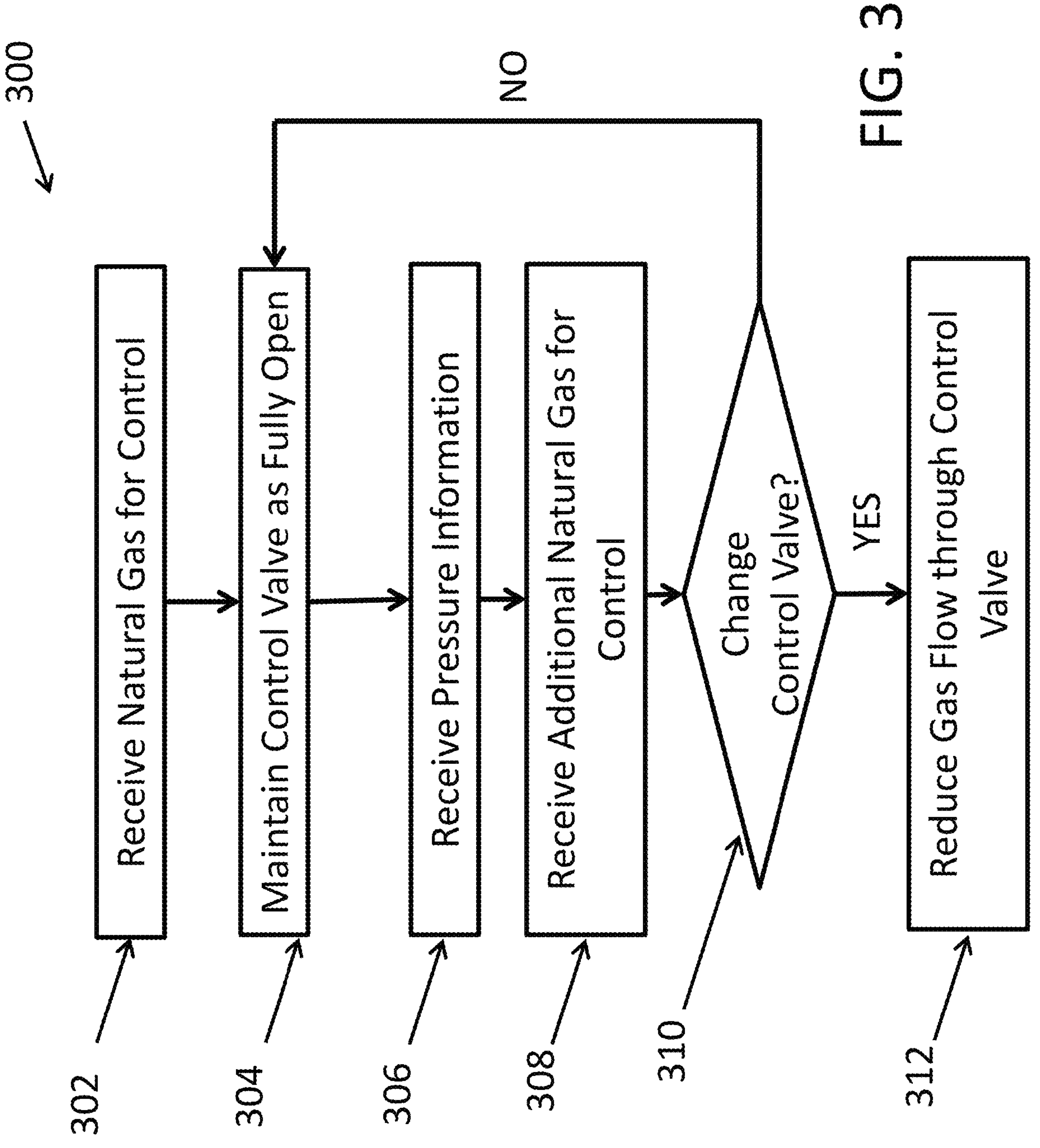
FIG. 3 is an example flowchart.

FIG. 3 is an example flow chart diagram of an example process 300. In embodiments, example process 300 may be performed by a controller (e.g., controller 108, 110, controller A, and/or controller B, as described in FIGS. 1, 2A, and 2B), device 406 and/or electronic application 408 (which are described in FIG. 4). In embodiments, example 300 may be conducted to control one or more valves within a system, such as system 100 and/or system 200. As shown in FIG. 3, at step 302, a controller may receive natural gas. In embodiments, the controller may receive the natural gas from a MP accumulator and a set of valves (e.g., v21 and v22). In embodiments, the controller may be controller A, controller B, controller 108, and/or controller 110. By receiving the gas pressure information of the natural gas (which is at a particular pressure that is the minimum pressure level that the controller may operate at), the controller, at step 304, maintains a control valve as open. In embodiments, the control valve may be a fail-open valve. In alternate embodiments, the control valve may be another type of valve. At step 306, the controller receives downstream pressure information (of the natural gas that is downstream of the controller). In embodiments, the pressure information may be associated with natural gas that is downstream of the control valve. At step 308, the controller receives additional natural gas (which includes reference pressure information) for its controlling mechanism (e.g., controlling a control valve). In embodiments, the additional natural gas is received via MP accumulator and another valve (e.g., v23). In embodiments, the MP accumulator and the other valve reduces the pressure of natural gas downstream of the controller and this reduced pressure natural gas is the additional natural gas then sent to the controller. At step 310, the controller change the control valve and determine whether it should change the amount of natural gas passing through the control valve. In embodiments, the controller makes this determination based on the downstream pressure information received in step 306 and the pressure reference information received in step 308. If the downstream pressure is below a particular threshold pressure level, then no changes are made to the control valve (NO) and the control valve is kept fully open (step 304). If the downstream pressure is above the particular threshold pressure level, then changes are made to the control valve (YES) at step 312. Thus, the controller partially (or fully) closes the control valve to reduce the amount of natural gas being sent downstream.

FIG. 4 is a diagram of example environment 400 in which systems, devices, and/or methods described herein may be implemented. FIG. 4 shows network 402, system 404, device 406, and application 408.

Network 402 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light Fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or network 402 may include a cellular network, a public land mobile network (PLMN), a second-generation (2G) network, a third-generation (3G) network, a fourth-generation (4G) network, a fifth-generation (5G) network, and/or another network. In embodiments, network 402 may allow for devices describe any of the described figures to electronically communicate (e.g., using emails, electronic signals, URL links, web links, electronic bits, fiber optic signals, wireless signals, wired signals, etc.) with each other to send and receive various types of electronic communications.

System 404 (e.g., system 100, system 200, and system 600 as described in FIGS. 1, 2A and 2B, and 6A, 6B, and 6C, respectively) may include one or more devices that can communicate and/or receive electronic information to/from device 406, and/or application 408, via network 402. In embodiments, system 404 may include valves, control valves, monitor valves, and/or heaters which may send/receive electronic information to/from device 406 (and/or application 408) to turn on or off different valves in system 404. In embodiments, system 404 may include sensors and/or gauges that communicate electronic information about pressure, temperature, and/or flow rates to device 406 and/or application 408 via network 402. In embodiments, system 404 may be system 100 and system 200. In embodiments, system 404 may be placed on moving device 410 (e.g., using a truck, tractor, type of boat, etc.) that can move or be moved from one location to another location. In alternate embodiments, moving device 410 may be a part of system 404. In embodiments, other than electrical power to communications devices (e.g., pressure gauges that can electronically communicate information) that are part of system 404, no other electrical power may be used to control any of the valves in system 404 (e.g., all valves may be pneumatically and/or mechanically controlled). In alternate embodiments, system 404 may be powered by electrical power, solar power, and/or other type of power. In embodiments, system 404 may be located at remote locations and be powered by its own power system which may be a generator system (e.g., operating on natural gas, diesel, etc.), and/or a solar-powered panel system which generates power that is used by one or more of the portions of system 404 in conjunction with other portions of system 404 that may require pneumatic power and/or no type of power (e.g., manually controlled valves).

Device 406 may include any computation or communications device that is capable of communicating with a network (e.g., network 402) with other device and/or systems, such as system 404. For example, device 406 may include a computing device, radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smartphone, a desktop computer, a laptop computer, a tablet computer, a camera, a digital watch, a digital glass, or another type of computation or communications device.

Device 406 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 406. Device 406 may have a touch screen and/or a keyboard that allows a user to electronically interact with an electronic application. In embodiments, a user may swipe, press, or touch device 406 in such a manner that one or more electronic actions will be initiated by device 406 via an electronic application.

Device 406 may include a variety of applications, such as, for example, a gas analyzer application, a flow rate application, a temperature application, a composition analyzer application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications that are a combination of two or more of the above applications (e.g., electronic application 408).

Electronic application 408 may be capable of interacting with device 406 and/or system 404 to automatically and electronically receive electronic information for one or more persons. In embodiments, electronic application 408 may obtain electronic information about pressure, temperature, and/or flow rates associated with natural gas. In embodiments, electronic application 408 may be associated with a graphical user interface that may display images, generate sounds, and/or display information associated with system 404.

Figure 5:
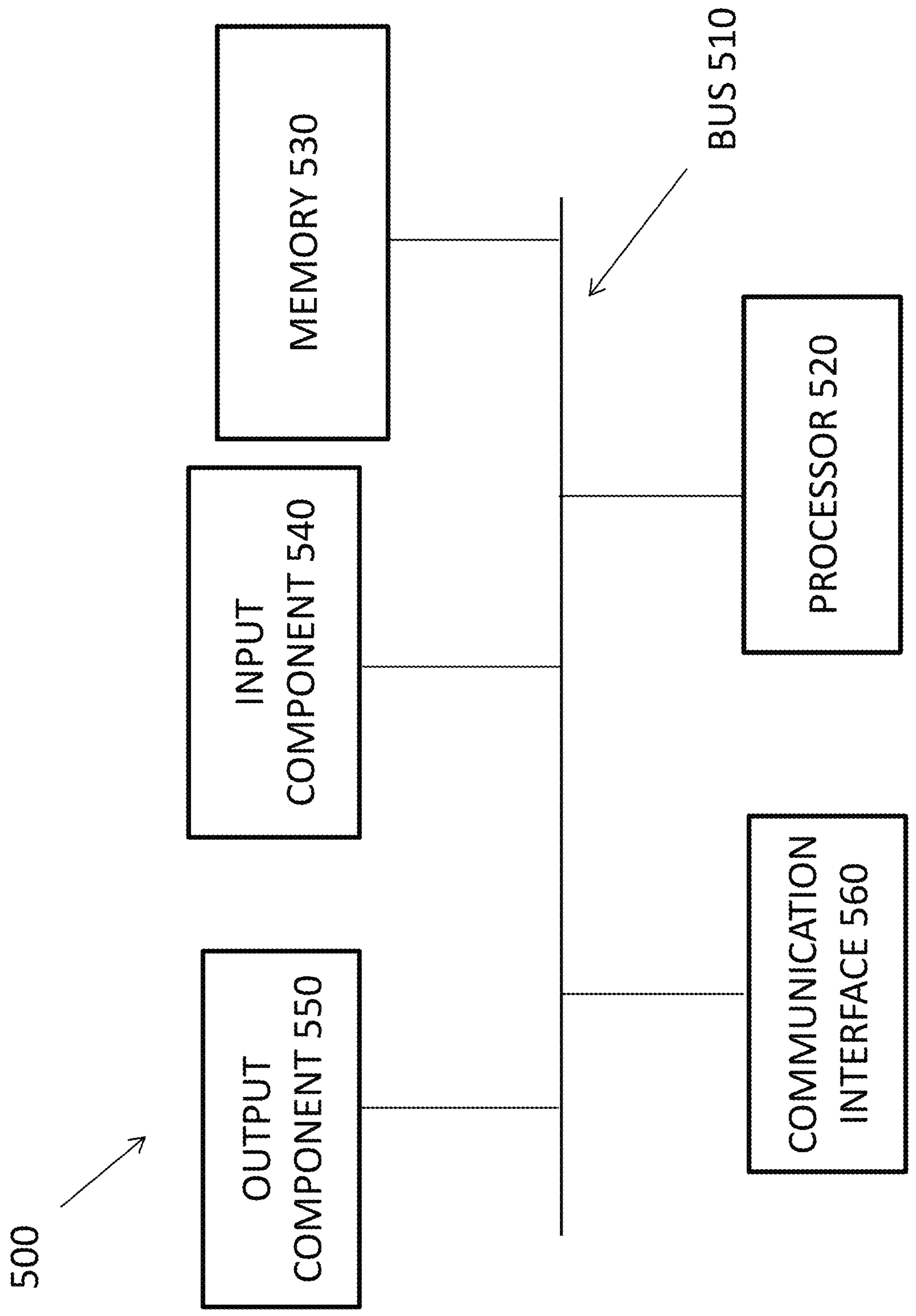
FIG. 5 is a diagram of an example computing device.

FIG. 5 is a diagram of example components of system 504 and device 506. Device 500 may correspond to computing devices, such as device 406, and/or a computing device feature that is part of systems 100, 200, and 600.

As shown in FIG. 5, device 500 may include a bus 510, a processor 520, a memory 530, an input component 540, an output component 550, and a communications interface 560. In other implementations, device 500 may contain fewer components, additional components, different components, or differently arranged components than depicted in FIG. 5. Additionally, or one or more components of device 500 may perform one or more tasks described as being performed by one or more other components of device 500.

Bus 510 may include a path that permits communications among the components of device 500. Processor 520 may include one or more processors, microprocessors, or processing logic (e.g., a field-programmable gate array (FPGA) or an application-specific integrated circuit (ASIC)) that interprets and executes instructions. Memory 530 may include any type of dynamic storage device that stores information and instructions, for execution by processor 520, and/or any type of non-volatile storage device that stores information for use by processor 520.

Input component 540 may include a mechanism that permits a user to input information to device 500, such as a keyboard, a keypad, a button, a switch, etc. Output component 550 may include a mechanism that outputs information to the user, such as a display, a speaker, one or more light-emitting diodes (LEDs), etc.

Communications interface 560 may include any transceiver-like mechanism that enables device 500 to communicate with other devices and/or systems. For example, communications interface 560 may include an Ethernet interface, an optical interface, a coaxial interface, a wireless interface, or the like.

In another implementation, communications interface 560 may include, for example, a transmitter that may convert baseband signals from processor 520 to radiofrequency (RF) signals and/or a receiver that may convert RF signals to baseband signals. Alternatively, communications interface 560 may include a transceiver to perform functions of both a transmitter and a receiver of wireless communications (e.g., radiofrequency, infrared, visual optics, etc.), wired communications (e.g., conductive wire, twisted pair cable, coaxial cable, transmission line, fiber optic cable, waveguide, etc.), or a combination of wireless and wired communications.

Communications interface 560 may connect to an antenna assembly (not shown in FIG. 5) for transmission and/or reception of the RF signals. The antenna assembly may include one or more antennas to transmit and/or receive RF signals over the air. The antenna assembly may, for example, receive RF signals from communications interface 560 and transmit the RF signals over the air, and receive RF signals over the air and provide the RF signals to communications interface 560. In one implementation, for example, communications interface 560 may communicate with a network (e.g., wireless network, Internet, Intranet, etc.).

As will be described in detail below, device 500 may perform certain operations. Device 500 may perform these operations in response to processor 520 executing software instructions (e.g., a computer program(s)) contained in a computer-readable medium, such as memory 530, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 530 from another computer-readable medium or another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Figure 6A:
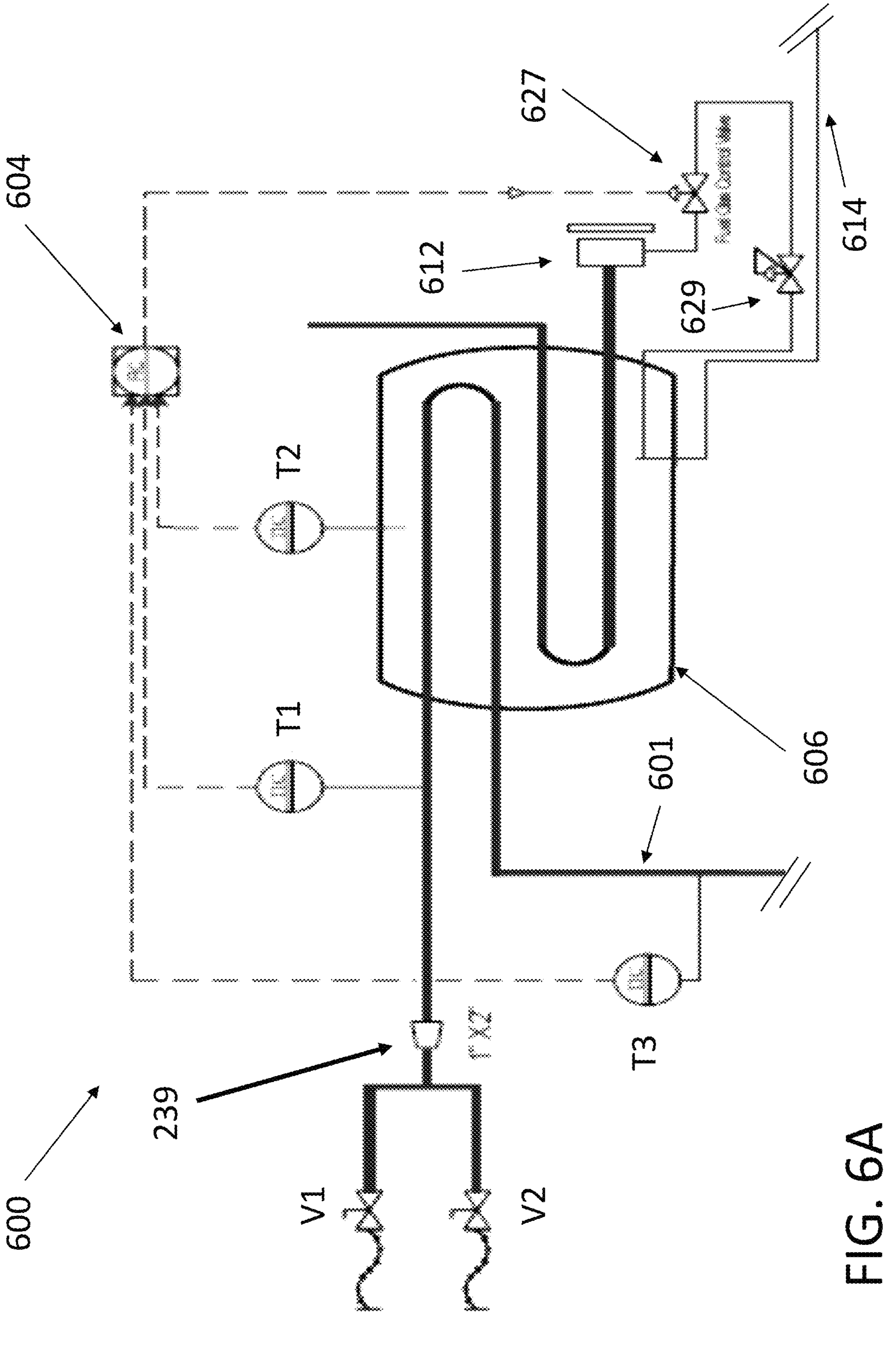
FIGS. 6A, 6B, 6C, and 6D are schematic diagrams of a process.
Figure 6B:
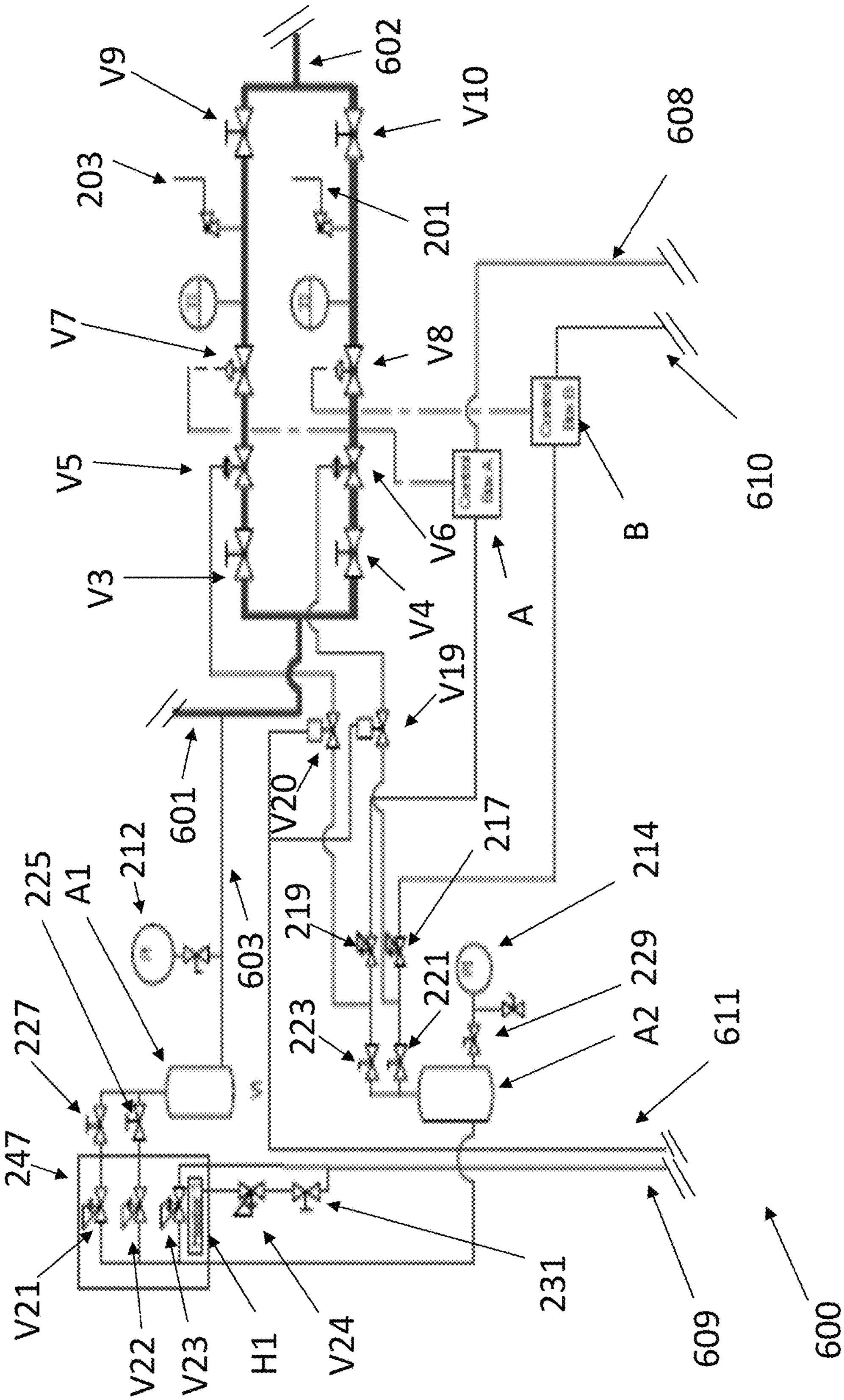
Figure 6C:
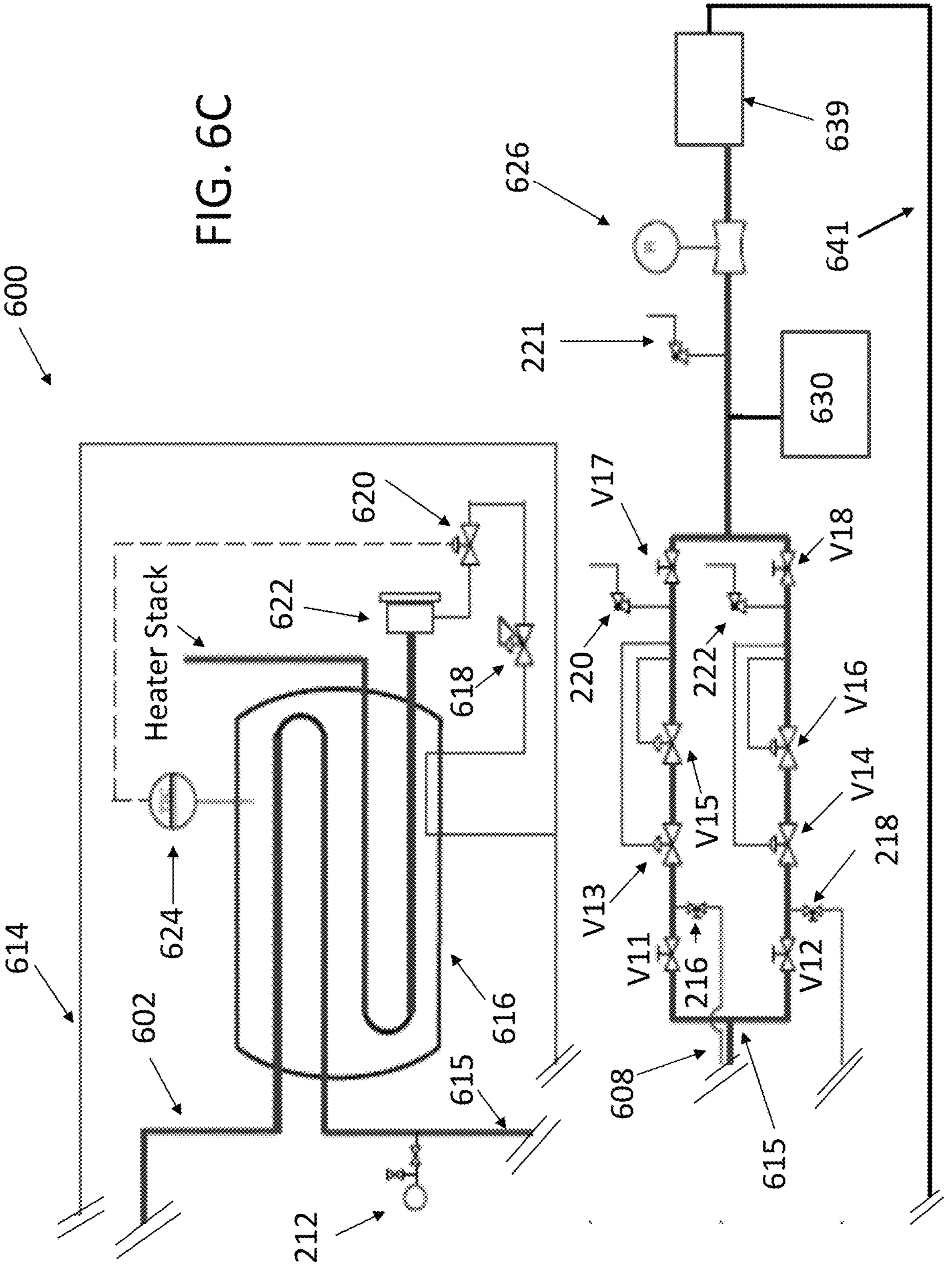
Figure 6D:
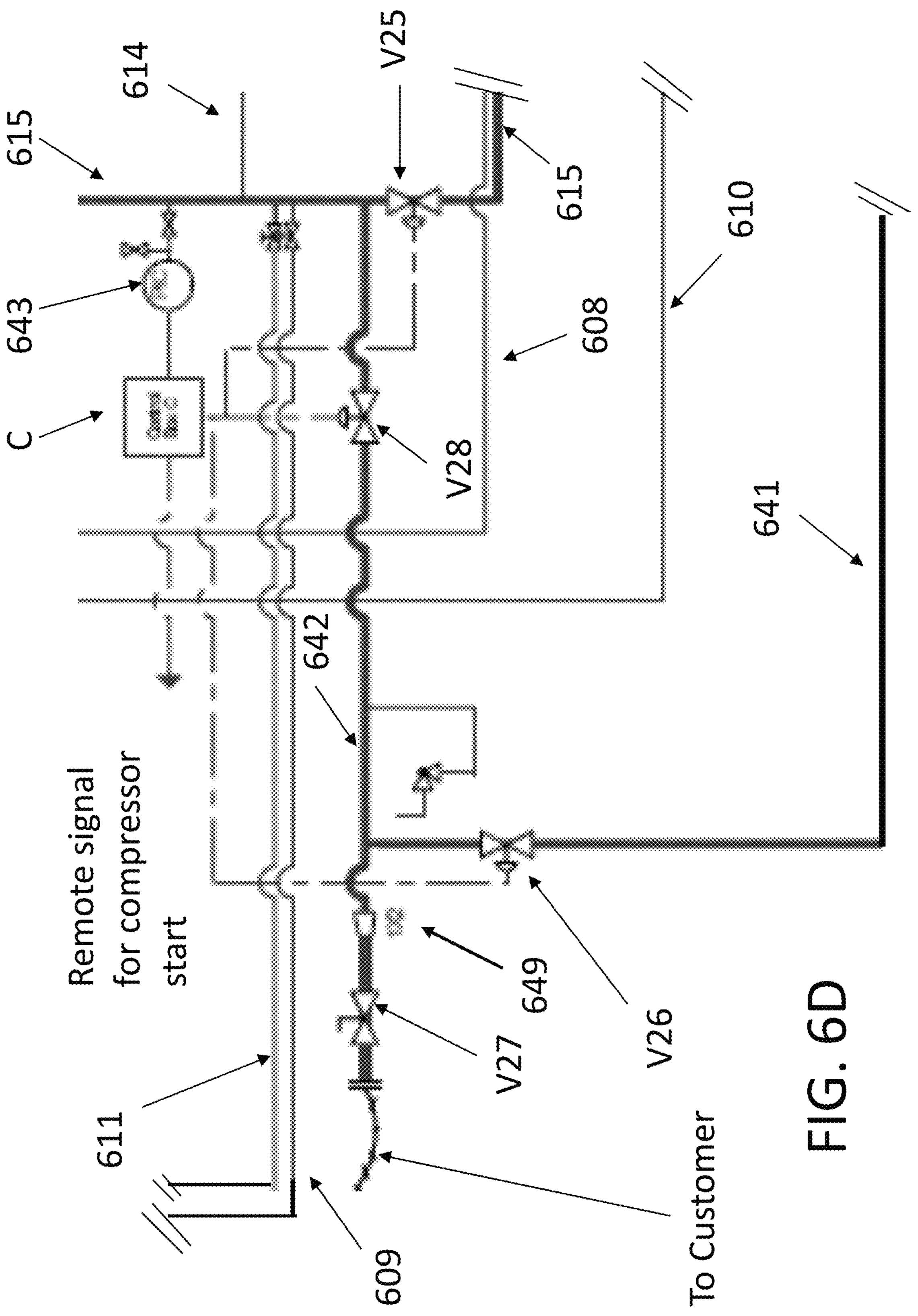

FIGS. 6A, 6B, 6C, and 6D are example diagrams of a system 600 for distribution of high-pressure gas as well as control systems for the high-pressure gas. FIG. 6A shows a first portion of system 600, FIG. 6B shows a second portion of system 600, FIG. 6C shows a third portion of system 600, and FIG. 6D shows a fourth portion of system 600. As shown in FIGS. 6A, 6B, 6C, and 6D, diagonal lines ("\\") are used on piping sections 601, 602, 608, 609, 610, 611, 614, 615, and 641 as they are shown across one or more of FIGS. 6A, 6B, 6C, and 6D. FIGS. 6A, 6B, 6C, and 6D, in combination, show valves v1, v2, v3, v4, v5, v6, v7, v8, v9, v10, v11, v12, v13, v14, v15, v16, v17, v18, v19, v20, v21, v22, v23, v24, v25, v26, v27, and v28. In addition, FIG. 6A, shows pipe expansion 239, temperature indicator controllers T1, T2, and T3, flow indicator controller 604, indirect heater 606, back pressure control valve 629, gas control valve 627, and burner 612. In addition, FIG. 6B shows heater H1 (e.g., a catalytic heater), high-pressure (HP) accumulator tank A1, medium-pressure (MP) accumulator tank A2, pressure safety valve 201, pressure safety valve 203, pressure gauges 212, 213, and 214, controller A, and controller B. FIG. 6B also shows valves 217, 219, 221, 223, 225, 227, 229, and 231. FIG. 6C also shows valves v11, v12, v13, v14, v15, v16, v17, v18, indirect heater 616, back pressure control valve 18, gas control valve 620, burner 622, fiscal reader 626, valve 628, valve 216, valve 218, pressure safety valve 220, pressure safety valve 221, pressure safety valve 222, compressor 639, and piping section 641. In addition, FIG. 6D shows pressure reader 643, control box C, and expansion valve 649.

In embodiments, any of the valves described in FIGS. 6A, 6B, 6C, and 6D may be opened and closed either (1) mechanically (e.g., manually), (2) pneumatically, (3) electrically, or (4) electronically based on electronic communications (e.g., wired and/or wireless from a computing device, such as device 406 described in FIG. 4). In FIGS. 6A, 6B, 6C, and 6D, controller A, valves v3, v5, v7, v9, v11, v13, v15, and v17 provide for 100% redundancy of controller B, valves v4, v6, v8, v10, v12, v14, v16, and v18 (and vice versa). Thus, for example, if there is a problem with valve v11 (e.g., based on pressure readings in system 600), then a changeover will be conducted to use controller B, valves v4, v6, v8, v10, v12, v14, v16, and v18. Also, for example, if there is a problem with valve v8 (based on pressure readings in system 600, a failure of the valve, etc.), then a changeover will be conducted to use controller A, valves v3, v5, v7, v9, v11, v13, v15, and v17. Furthermore, piping sections are shown in FIGS. 6A, 6B, 6C, and 6D that may not be numbered but may be described based on their location to other features, such as controllers, valves, pressure gauges, accumulators, pressure safety valves, etc.

In embodiments, controller A may be a pneumatic, electric, hydraulic, electrohydraulic, or an electro-pneumatic controller. In embodiments, controller B may be a pneumatic, electric, hydraulic, electrohydraulic, or an electro-pneumatic controller. In embodiments, as shown in FIG. 6B, depending on the type of controller and the type of valve, the line between controller A and v7 may be a pneumatic line, hydraulic line, electric line, or any other line that can provide motive power (e.g., actuate, control, etc.) to v7. In embodiments, as shown in FIG. 6B, depending on the type of controller and the type of valve, the line between controller B and v8 may be a pneumatic line, hydraulic line, electric line, or any other line that can provide motive power (e.g., actuate, control, etc.) to v8. While A1 may be a HP accumulator, A1 in other examples may be any other type of pressure accumulator. While A2 may be MP accumulator, A2 in other examples may be any other type of pressure accumulator.

In a non-limiting example, natural gas is received through v1 from a high-pressure tank. In embodiments, v1 (and v2) can be opened manually or electronically via electronic communications (e.g., wired, wirelessly, etc.). However, natural gas can also be provided through v2 or a combination of two tanks (e.g., tanks 101, 102, etc.) from both v1 and v2. In this non-limiting example, there is no natural gas in the system until (1) natural gas is sent to v3 and/or v4, and (2) natural gas is sent through v1 and passes to high-pressure accumulator tank A1. In embodiments, the piping diameter after v1 and v2, and before pipe expansion 239, is smaller than the piping diameter of the piping after pipe expansion 239. For example, piping up to pipe expansion 239 (from v1 and v2) may be one inch in diameter while piping after pipe expansion 239 may be two inches in diameter. In embodiments, before any gas enters from any tank into any of the piping sections, v5 may be closed and v7 may be open. In embodiments, v5 may be a fail-close valve.

In a non-limiting example, gas passes through pipe expansion 239 and enters indirect heater 606. In embodiments, two temperature indicator controllers T1 and T3 provide temperature readings of the gas while T2 provides the temperature reading for the water or water/glycol mixture. In embodiments, temperature indicator controller T1 senses the temperature before the gas enter indirect heater 606, temperature indicator control T2 senses the water/glycol temperature of the output heat of indirect heater 606, and temperature indicator control T3 senses the temperature of the gas (passing through piping 601) that has exited indirect heater 606. In embodiments, the temperature information from T1, T2, and T3 are all sent to flow indicator controller 604. In embodiments, flow indicator controller 604 analyzes the differences between the temperature information received from T1, T2, and T3 to determine how much gas control valve 627 should be opened to provide gas to indirect heater 606. Thus, the amount of gas sent through gas control valve 627 determines how much heating is provided by indirect heater 606 which determines temperature reading at T3 which is based upon a total analysis by flow indicator controller 604 of temperature readings from T1, T2, and T3. In embodiments, gas used for firing indirect heater 606 is sent to gas control valve 627 via back pressure control valve 629. In embodiments, back pressure controller valve 629 reduces the pressure of gas entering back pressure controller valve 629 to a pressure level of gas required by indirect heater 606. In embodiments, back pressure controller valve 629 receives natural gas pressure signal from piping section 614 downstream of the valve.

For example, the temperature reading at T1 may be 0 degrees F., the temperature reading at T2 is at 130 degrees F., and a required temperature at T3 is 100 degrees F. Based on the required temperature of 100 degrees F. of the gas in piping section 601, flow indicator controller 604 takes the 0 degree F. reading, the 130 degrees F. reading, and the required 100 degrees F. temperature to determine whether gas control valve 627 should be opened or closed. The opening or closing of gas control valve 627 is based on (1) whether the output of indirector heater 606 should be increased or decreased, (2) the flow rate of gas entering indirect heater 606, and (3) the output temperature requirement of the gas in piping section 601.

In embodiments, the gas may have its temperature increased by indirect heater 606. Alternatively, gas may exit indirect heater 606 at the same temperature as when the gas enters indirect heater 606 since the incoming temperature reading is within a particular threshold or is at the temperature requirement of the gas at the location on piping section 601 where T3 is located.

In embodiments, gas passes from indirect heater 606 through piping section 601 and, as shown in FIG. 6B, continues through piping section 601 and also is sent through piping section 603 which is then sent to tank A1.

In embodiments, the pressure within tank A1 (a HP accumulator) may vary following the pressure within tanks 101 or 103. In embodiments, tank A1 holds a small volume of natural gas to dampen any pressure variations that may occur within the mainline (e.g. one or more piping sections). Upon exiting tank A1, the natural gas is then sent to v21 via valve 227 and/or v22 via valve 225. As the natural gas passes through v21 and/or v22 the pressure is reduced (e.g., from 1000 PSIG to 200 PSIG) and the natural gas is sent to tank A2 (a MP accumulator). In embodiments, v21, v22, v23, and H1, may be located in a cabinet 247. In embodiments, tank A2 contains a modest volume (e.g., less than 50 liters) of natural gas to further reduce any effects of pressure variations that may occur within the piping sections.

After leaving tank A2, the natural gas then passes through valves 223 and 219, the pressure is further reduced to an operating pressure (e.g., 20 PSIG). In addition, the natural gas is delivered via valve 229 to pressure gauge 214. In embodiments, the pressure reading by pressure gauge 214 provides information (e.g., viewed locally or sent via electronic communications to another device) about whether the amount of natural gas in A2 is below a particular threshold level. At any time, in this or any other non-limiting example, if the pressure information read by pressure gauge 214 is below the particular threshold, this may indicate that there is not enough natural gas in a high-pressure tank and that the tank should be replaced. A portion of the natural gas exiting valve 219 at the final operating pressure is sent to v20, which is an inverse acting valve. Since v20 is receiving low-pressure information regarding the natural gas, v20 will be fully open. This will allow the natural gas to proceed and pass through v5. At this point, v5 (which is a fail-close valve) is opened based on the fully-open position of v20. In addition, pressure information (e.g., pressure reference information) of the natural gas exiting tank A2 may be used by controller A (via valve 223 and then valve 219) to control valve v7 at a later time. However, at this particular time, in this non-limiting example, v7 is currently open and allows gas now passing through v5 to continue to flow.

In between v7 and v9, a pressure safety valve 203 is provided to prevent a pressure build-up from occurring between v7 and v9. Once the natural gas passes v9, the natural gas enters piping section 602. The natural gas flows through piping section 602 and then enter indirect heater 616 (e.g., a water bath heater) as shown in FIG. 6C. Within indirect heater 616, the natural gas is heated, indirectly, to maintain a temperature level. In embodiments, indirect heater 616 contains water which is heated by burner 622 (e.g., a natural gas burner) and uses the heated water via a heat exchange to heat the natural gas as that enters through piping section 602. In embodiments, a portion of gas from piping section 614 is bypassed and enters indirect heater 616 and then passes through back pressure control valve 618 which reduces the gas pressure to one that can be used by indirect heater 616. In embodiments, the gas with reduced pressure is then sent to gas control valve 620. In embodiments, gas control valve 620 is controlled by temperature indicator controller 624 which senses the temperature of gas inside indirect heater 616; and, based on the temperature, temperature indicator controller 624 sends a communication to gas control valve 620. In embodiments, the communication to gas control valve 620 provides information to whether gas control valve 620 should either (1) further open to allow more gas to enter indirect heater 616 and provide additional heating, or (2) further close to reduce the amount of gas entering indirect heater 616 and reduce the amount of heating of gas entering indirect heater 616.

Thus, the natural gas exits indirect heater 616 and enters piping section 615. In embodiments, the natural gas follows piping section 615, as shown in FIG. 6D, which then enters the portion of piping section 615, shown again on FIG. 6C, that then enters valve v11 (as shown in FIG. 6C). In this non-limiting example, pressure reader 643 determines that the gas pressure entering piping section 615 is equal to or greater than threshold pressure level required by the customer. Thus, gas passes from 615 through piping section 643, as v28 is open, and then via pipe expansion 649 and valve v27. In addition, the natural gas then passes through monitor valves v13 and v15. In embodiments, monitor v13 is an inactive monitor valve that is only used if there is a problem with active monitor valve v15. For example, inactive monitor valve v13 may actuate at a pressure level of 55 PSIG while active monitor valve v15 may operate at a pressure level of 50 PSIG. If there is a problem with v15, then v13 will take over. In embodiments, v13 operates at a higher pressure and will remain in the open position. If v15 fails, then the pressure level will be higher than the required pressure level and, thus, v13 will operate as there is now a higher pressure in that piping section.

After monitor valve v15, a pressure safety valve 220 is provided. If there are no problems with pressure, the natural gas passes through v17 and passes by pressure safety valve 221. As shown in FIG. 6C, gas analyzer 630 (when compressor 639 is operating) may be used to analyze one or more features of the gas passing through the system. Also, shown in FIG. 6C, fiscal reader 626 may be used to provide information about the amount of gas flow (such as amount of cubic feet of gas, etc.) to determine the quantity of gas being sent to a customer via valve v27. In embodiments, fiscal reader 626 does so if compressor 639 is operating. As shown in FIG. 6C, in this non-limiting example, compressor 639 is not operating (as no communication has been sent to compressor 639 from control box C) and the natural gas passes through piping section 641 which continues on piping section 641 as shown in FIG. 6D. As shown in FIG. 6D, natural gas enters piping section 642 from piping 641, where then piping section 642 sends natural gas to a particular customer whose system is connected to system 600. In this particular non-limiting example, valve v26 is closed while valve v28 is open. In embodiments, only a communication from control box C will open v26 and close v28.

In this non-limiting example, when natural gas enters piping section 615, the gas may also follow piping section 609 (as shown in FIG. 6D). The natural gas entering piping section 609 is sent to heater H1 (via valve 231) and also valve v23. The natural gas sent to v23 is then sent to mid-pressure accumulator tank A2. This natural gas is then used to provide reference pressure information to controller A. Thus, controller A no longer requires natural gas (and the natural gas pressure information) via A1, V21 and/or V22 which are only used to provide the initial pressure needed for controller A to operate the first time. In this non-limiting example, the natural gas pressure exiting v23 is at a higher pressure than the natural gas that is exiting v21 and/or v22 from high-pressure accumulator A1. Thus, the pressure from v23 back-pressurizes and prevents gas from v21 and/or v22 from proceeding any further. Thus, the gas passes from v23 and then enters mid-pressure accumulator A2.

In addition, the natural gas that enters piping section 615 also enters piping section 611, as shown in FIG. 6D. The gas from piping section 611 goes to v20 and provides gas pressure information to v20. If this pressure (provided in the gas pressure information) is above a prescribed level (e.g., an operator adjustable set point), v20 will close and shut off the natural gas required to operate v5 (as v5 is a fail-close valve). Thus, v5 will close and prevent the pressure within the pipeline increasing beyond this prescribed level and may also prevent any safety valves from opening and allowing natural gas to be emitted to the atmosphere.

In this non-limiting example, when gas enters v11, a portion of gas is sent through valve 216 and natural gas is sent through piping section 608 to controller A. In this non-limiting example, controller A receives downstream natural gas pressure information from the natural gas sent through piping section 608. Based on comparing downstream natural gas pressure information with the reference pressure information (received via valve 219), controller A controls v7 to determine how much natural gas (as long as natural gas is flowing through v5) should flow through v7.

In another non-limiting example, natural gas is received through v1 from a high-pressure tank. In embodiments, v1 (and v2) can be opened manually or electronically via electronic communications (e.g., wired, wirelessly, etc.). However, natural gas can also be provided through v2 or a combination of two tanks from both v1 and v2. In this non-limiting example, there is no natural gas in the system until (1) natural gas is sent to v3 and/or v4, and (2) natural gas is sent through v1 and passes to high-pressure accumulator tank A1. In embodiments, the piping diameter after v1 and v2, and before pipe expansion 239, is smaller than the piping diameter of the piping after piping expansion 239. For example, piping up to pipe expansion 239 (from v1 and v2) may be one inch in diameter while piping after pipe expansion 239 may be two inches in diameter. In embodiments, before any gas enters from any tank into any of the piping sections, v6 may be closed and v8 may be open. In embodiments, v6 may be a fail-close valve.

In a non-limiting example, gas passes through pipe expansion 239 and enters indirect heater 606. In embodiments two temperature indicator controllers T1, and T3 provide temperature readings of the gas while T2 provides the temperature of the glycol/water mixture within the indirect heater 606. In embodiments, temperature indicator controller T1 senses the temperature before the gas enter indirect heater 606, temperature indicator control T2 senses the temperature of the output heat of indirect heater 606, and temperature indicator control T3 senses the temperature of the gas (passing through piping 601) that has exited indirect heater 606. In embodiments, the temperature information from T1, T2, and T3 are all sent to flow indicator controller 604. In embodiments, flow indicator controller 604 analyzes the differences between the temperature information received from T1, T2, and T3 to determine how much gas control valve 627 should be opened to provide gas to indirect heater 606. Thus, the amount of gas sent through gas control valve 627 determines how much heating is provided by indirect heater 606 which determines temperature reading at T3 which is based upon a total analysis by flow indicator controller 604 of temperature readings from T1, T2, and T3. In embodiments, gas used for firing indirect heater 606 is sent to gas control valve 627 via back pressure controller valve 629. In embodiments, back pressure controller valve 629 reduces the pressure of gas entering back pressure controller valve 629 to a pressure level of gas required by indirect heater 606. In embodiments, back pressure controller valve 629 receives natural gas from piping section 614. In embodiments, back pressure controller 629 may reduce the pressure to a particular pressure that may be inches of water pressure.

For example, the temperature reading at T1 may be 0 degrees F., the temperature reading at T2 is at 130 degrees F., and a required temperature at T3 is 100 degrees F. Based on the required temperature of 100 degrees F. of the gas in piping section 601, flow indicator controller 604 takes the 0 degree F. reading, the 130 degrees F. reading, and the required 100 degrees F. temperature to determine whether gas control valve 627 should be opened or closed. The opening or closing of gas control valve 627 is based on (1) whether the output of indirector heater 606 should be increased or decreased, (2) the flow rate of gas entering indirect heater 606, and (3) the output temperature requirement of the gas in piping section 601.

In embodiments, the gas may have its temperature increased by indirect heater 606. Alternatively, gas may exit indirect heater 606 at the same temperature as when the gas enters indirect heater 606 since the incoming temperature reading is within a particular threshold or is at the temperature requirement of the gas at the location on piping section 601 where T3 is located.

In embodiments, gas passes from indirect heater 606 through piping section 601 and, as shown in FIG. 6B, continues through piping section 601 and also is sent through piping section 603 which is then sent to tank A1.

In embodiments, the pressure within tank A1 (a HP accumulator) may vary following the pressure within tanks 101 or 103. In embodiments, tank A1 holds a small volume to natural gas to dampen any pressure variations that may occur within the mainline (e.g., one or more piping sections). Upon exiting tank A1, the natural gas is then sent to v21 via valve 227 and/or v22 via valve 225. As the natural gas passes through v21 and/or v22 the pressure is reduced (e.g., from 1000 PSIG to 200 PSIG) and the natural gas is sent to tank A2 (a MP accumulator). In embodiments, tank A2 contains a modest volume (e.g., less than 50 liters) of natural gas to further reduce any effects of pressure variations that may occur within the piping sections.

After leaving tank A2, the natural gas then passes through valves 221 and 217, the pressure is further reduced to an operating pressure (e.g., 20 PSIG). In addition, the natural gas is delivered via valve 229 to pressure gauge 214. A portion of the natural gas exiting valve 217 at the final operating pressure is sent to v19, which is an inverse acting valve. Since v19 is receiving a low-pressure communication (e.g., gas pressure information) from the mainline (e.g., one or more piping sections), v19 will be fully open. This will allow the natural gas to proceed and pass through v6. At this point, v6 (which is a fail-close valve) is opened based on the fully-open position of v19.

In addition, pressure information (e.g., pressure reference information) of natural gas exiting tank A2 may be used by controller B (via valve 221 and then valve 217) to control valve v8 at a later time. However, at this particular time, in this non-limiting example, v8 is currently open and allows gas now passing through v6 to continue to flow.

In between v8 and v10, a pressure safety valve 201 is provided to prevent a pressure build-up from occurring between v8 and v10. Once the natural gas passes v10, the natural gas enters piping section 202. In embodiments, the natural gas flows through piping section 602 and then enter indirect heater 616 (e.g., a water bath heater) as shown in FIG. 6C. Within indirect heater 616, the natural gas is heated, indirectly, to maintain a temperature level. In embodiments, indirect heater 616 contains water which is heated by burner 622 (e.g., a natural gas burner) and uses the heated water via a heat exchange to heat the natural gas as that enters through piping section 602. In embodiments, a portion of gas from piping section 614 is bypassed and enters indirect heater 616 and then passes through back pressure controller valve 618 which reduces the gas pressure to one that can be used by indirect heater 616. In embodiments, back pressure controller valve 618 may reduce the gas pressure to a particular quantity of inches of water pressure. In embodiments, the gas with reduced pressure is then sent to gas control valve 620. In embodiments, gas control valve 620 is controlled by temperature indicator controller 624 which senses the temperature of gas inside indirect heater 616; and, based on the temperature, temperature indicator controller 624 sends a communication to gas control valve 620. In embodiments, the communication to gas control valve 620 provides information to whether gas control valve 620 should either (1) further open to allow more gas to enter indirect heater 616 and provide additional heating, or (2) further close to reduce the amount of gas entering indirect heater 616 and reduce the amount of heating of gas entering indirect heater 616.

Thus, the natural gas exits indirect heater 616 and enters piping section 615. In embodiments, the natural gas follows piping section 615, as shown in FIG. 6D, which then enters the portion of piping section 615, shown again on FIG. 6C, that then enters valve v12 (as shown in FIG. 6C). In this non-limiting example, pressure reader 643 determines that the gas pressure entering piping section 615 is equal to or greater than threshold pressure level required by the customer. Thus, gas passes from 615 through piping section 643, as v28 is open, and then via pipe expansion 649 and valve v27. In addition, the natural gas then passes through monitor valves v14 and v16. In embodiments, monitor v14 is an inactive monitor valve that is only used if there is a problem with active monitor valve v16. For example, inactive monitor valve v14 may actuate at a pressure level of 55 PSIG while active monitor valve v16 may operate at a pressure level of 50 PSIG. If there is a problem with v16, then v14 will take over. In embodiments, v14 operates at a higher pressure and will remain in the open position. If v16 fails, then the pressure level will be higher than the required pressure level and, thus, v14 will operate as there is now a higher pressure in that piping section. After monitor valve v16, a pressure safety valve 222 is provided. If there are no problems with pressure, the natural gas passes through v18 and then passes by pressure safety valve 221.

As shown in FIG. 6C, gas analyzer 630 (when compressor 639 is turned on) may be used to analyze one or more features of the gas passing through the system. Also, shown in FIG. 6C, fiscal reader 626 may be used to provide information about the amount of gas flow (such as amount of cubic feet of gas, etc.) to determine the quantity of gas being sent to a customer via valve v27. As shown in FIG. 6C, in this non-limiting example, compressor 639 is not operating (as no communication has been received from control box C to turn on compressor 639) and the natural gas passes through piping section 641 which continues on piping section 641 as shown in FIG. 6D. As shown in FIG. 6D, natural gas enters piping section 642 from piping 641, where then piping section 642 sends natural gas to a particular customer whose system is connected to system 600. In this particular non-limiting example, valve v26 is closed while valve v28 is open. In embodiments, only a communication from control box C will open v26 and close v28.

In this non-limiting example, when natural gas enters piping section 205, the natural gas may also follow piping section 609, as shown in FIG. 6D. The natural gas entering piping section 609 is sent to heater H1 (via valve 231) and valve v23. The natural gas sent to v23 is then sent to mid-pressure accumulator tank A2. The natural gas sent to v23 is then sent to mid-pressure accumulator tank A2. This natural gas is then used to provide reference pressure information to controller B. Thus, controller B no longer requires natural gas (and natural gas pressure information) via A1, V21 and/or V22 which are only used to provide the initial pressure needed for controller B to operate the first time. In this non-limiting example, the natural gas pressure exiting v23 is at a higher pressure than the natural gas that is exiting v21 and/or v22 from high-pressure accumulator A1. Thus, the pressure from v23 back-pressurizes and prevents gas from v21 and/or v22 from proceeding any further. Thus, the gas passes from v23 and then enters mid-pressure accumulator A2.

In addition, the natural gas that enters piping section 615 is sent to piping section 611 which goes to v19 and provides gas pressure information to v19. If this pressure value (provided in the gas pressure information) is above a prescribed level (e.g., an operator adjustable set point) v19 will close and shut off the natural gas required to operate v6 (as v6 is a fail-close valve). Thus, v6 will close and prevent the pressure within the pipeline increasing beyond this prescribed level and may also prevent any safety valves from opening and allowing natural gas to be emitted to the atmosphere.

In this non-limiting example, when gas enters v12, a portion of gas is sent through valve 218 and natural gas is sent through piping section 210 to controller B. In this non-limiting example, controller B receives downstream natural gas pressure information from the natural gas sent through piping section 610. Based on comparing downstream natural gas pressure information with the reference pressure information (received via valve 217), controller B controls v8 to determine how much natural gas (as long as natural gas is flowing through v6) should flow through v8.

While the above description of FIGS. 6A, 6B, 6C, and 6D provides one or more embodiments of providing natural gas (or another gas) from v1 and/or v2 through system 600 to v27 and then to another system connected to system 600, FIGS. 6A, 6B, 6C, and 6D may also use control box C and compressor 639 to provide natural gas via v26 at a particular pressure level. In embodiments, when natural gas passes through piping section 615 (as shown in FIG. 6D), pressure reader 643 will read the pressure in piping section 615. In embodiments, pressure reader 643 then sends the pressure information to control box C. In embodiments, control box C analyzes the pressure information and makes a determination whether to send a communication (wired or wirelessly) to compressor 639 to begin operation. In embodiments, the determination whether to send a communication to compressor 639 is based on the natural gas pressure. As natural gas is sent from one or more tanks, the pressure may begin to become less and less as more natural gas is being provided to a customer's system. Accordingly, the pressure of the natural gas from one or more tanks may have enough pressure. Thus, if the amount of natural gas is equal or above a particular threshold pressure level that is required for the customer's system, then natural gas will pass through piping section 642, via piping section 615, as control box C keeps valve v28 open and may keep valve 26 open or closed. In addition, control box C does not send a communication to compressor 639 to turn on. Preceding examples associated with FIGS. 6A, 6B, 6C, and 6D describe examples where the amount of natural gas pressure passing through piping section 615 is equal or greater than the pressure threshold requirements of the customer. Furthermore, the preceding examples have v26 closed and v28 open.

However, as the amount of natural gas from one or more tanks begins to decrease, the remaining amount of natural gas in the one or more tanks may not be enough to provide natural gas to the customer's system. Thus, the one or more tanks may be replaced with natural gas with higher amounts of pressure. Rather than replacing the one or more tanks, the pressure of the remaining amount of natural gas may be used by increasing the pressure via a compressor, such as compressor 639. Accordingly, this allows for further use of tanks that send gas via v1 and/or v2 and delaying the time to replace such tanks.

Accordingly, if the natural gas pressure is less than a particular pressure threshold level that is required for the customer's system, then control box C (upon receiving pressure information from pressure reader 643) closes v28, opens valve v26, and also sends a communication to compressor 639. Thus, compressor 639 increases the pressure of the natural gas entering compressor 639 when then sends the pressurized natural gas via piping section 641 through v26 and through v27 to the customer's system.

As shown in FIG. 6D, valve v25 is kept open by control box C regardless of valves v26 or v28 are open or closed. In embodiments, control box C may close v25 in the event of an emergency (e.g., if the pressure from pressure reader 643 is above a particular value). In alternate embodiments, valve v25 may be removed from piping section 615. In embodiments, another gas analyzer 630 and fiscal reader 626 may be placed after expansion valve 649.

In embodiments, for FIGS. 6A, 6B, 6C, and 6D, device 406 (described in FIG. 4) may in communication with system 600 (e.g., system 404 described in FIG. 4). In embodiments, device 406 may receive electronic information about pressure readings in system 600 and generate messages to switch over from one set of valves to another set of valves in the event of problems occurring within the system. For example, if there is a problem with valve v4 (based on pressure readings in system 600, a failure of the valve, etc.), then device 406 may receive information about the problem (e.g., pressure reading information) and generate a message to conduct a changeover and use valves v3, v5, v7 and v9, and controller A. In embodiments, the messages may be sent to one or more valves in system 600 which are used to open or close the valves. Additionally, or alternatively, the messages may be sent to a user of system 600 who may change one or more valves in system 600 manually (e.g., mechanically).

In embodiments, device 406 may be associated with a graphical user interface that includes a visual display. In embodiments, device 406 may be associated with a control panel system that includes alarms, warning lights, and/or other lighting indicators that are may be incorporated as part of the graphical user interface or are part of an analog system. Thus, a user may use the graphical user interface to view various types of information that are used to make decisions as to whether one or more valves should be opened or closed. In embodiments, based on changing requirements (e.g., pressure requirements) of natural gas supply of system 600 to an end-user, a set point for a controller (e.g., controller A, controller B, etc.) may be adjusted (e.g., electronically, manually, etc.) to accommodate any such updates. In embodiments, the set point value may be based on reference pressure information, a relationship between the reference pressure information and the downstream pressure information, or another value.

In embodiments, a controller may adjust a control valve (e.g., v7) based on comparing the set point to (i) a value based on a relationship (e.g., differential, proportional, etc.) between reference pressure information and downstream pressure information, (ii) a value based on downstream pressure information, (iii) a value based on reference pressure information, or (iv) another value (e.g., end-user pressure requirements). For the examples described above for systems 100, 200, and 600, in embodiments, a set point value for v19 may be less than, equal to, or greater than a set point value for controller A. Also, in embodiments, a set point value for v20 may be less than, equal to, or greater than s set point value for controller B. In embodiments, any set point may be adjusted based on gas pressure requirements of an end-user system. For the non-limiting examples described in FIG. 2, gas refers to natural gas. However, in other examples, other types of gases may be used, such as biogas, oxygen, reclaimed natural gas, or any other type of gas.

In the preceding specification, gas may be interchangeably used with natural gas. While natural gas is used in the examples described in the preceding specification, any of the systems described in FIGS. 1, 2A, and 2B, 6A, 6B, 6C, and 6D, may use other types of gases, such as biogas, oxygen, reclaimed natural gas, or any other type of gas. Furthermore, in the preceding specification, a high-pressure tank may be a type of tank, vessel, storage device, or any other container that contains gas. In the preceding specification, as shown in FIGS. 1, 2A, and 2B, 6A, 6B, 6C, and 6D each of the valves, pressure readers, flow rate readers, and/or temperature readers, may receive or send electronic information via wired or wireless communications to a computing device (e.g., device 406). Furthermore, while FIGS. 6A, 6B, 6C, and 6D may describe indirect heaters 606 and 616, in other embodiments, indirect heaters 606 and 616 may be combined into a single indirect heater. Thus, piping section 601 enters a particular indirect heater and is heated, and after being reduced in temperature and pressure, reenters the same indirect heater via piping section 602 and is heated using the same burner and glycol mixture that heated the gas that was imported by piping section 601. Also, while FIGS. 6A, 6B, and 6C may describe indirect heaters 606 and 616 using a glycol mixture, other types of heaters may be used While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Also it will be understood that any of the various actions can result in any type of electronic information to be displayed in real-time and/or simultaneously on multiple user devices (e.g., similar to user device 212). For FIG. 3, the order of the blocks may be modified in other implementations. Further, non-dependent blocks may be performed in parallel.

In the preceding specification, a high-pressure accumulator (e.g., A1 in FIG. 2A) and a mid-pressure accumulator may be an American Society of Mechanical Engineers (ASME) certified expansion tank (e.g., bladder tank, diaphragm tank, etc.). In the preceding specification, a controller (e.g., controller 108, controller 110, controller A, controller B) may be a controller that can compare sensed process pressure (or differential pressure) with an operator-adjusted set point, and send a pneumatic signal to an adjacent control element (e.g., control valve v7) that maintains the process pressure at or near the set point value. In embodiments, a controller may be proportional only, proportional plus reset, differential gap, or any other type of configuration. In the preceding specification, a control valve (e.g., v7 and v8) may be a type of globe valve may be controlled pneumatically, electrically, and/or electronically. In the preceding specification, valves (e.g., v3) may be a type of ball valve. In the preceding specification, safety valves may be a type of relief valve (e.g., threaded or flanged valve). In the preceding specification, a fail-close valve (e.g., v5) may be a stem guided and/or non-balanced valve. In embodiments, monitor valves (e.g., v14, v16, etc.) may be a type of rotary ball type valve or any other type of valve.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:

a high-pressure tank;

a first piping configuration connecting the high-pressure tank to a first indirect heater;

a second piping configuration connected to an exit side of the first indirect heater and the second piping configuration branches off into two piping branches, with:

a first piping branch including a first valve and a first fail-close valve, and a first control valve, wherein the first fail-close valve is connected to a first inverse acting valve and the first control valve is connected to a first controller, and a second piping branch including a second valve and a second fail-close valve, and a second control valve, wherein the second fail-close valve is connected to a second inverse acting valve and the second control valve is connected to a second controller;

a third piping configuration that occurs after the first valve, the first fail-close valve, the first control valve, the second valve, the second fail-close valve, and the second control valve, wherein the third piping configuration is a combination of the first piping branch and the second piping branch;

a second indirect heater that is connected to the third piping configuration, wherein the second indirect heater is closer to the first control valve than the first fail-close valve;

a fourth piping configuration, connected to an exit side of the second indirect heater, wherein a third control valve is located on the fourth piping configuration and the third control valve is controlled by a third controller, wherein the third controller is connected to a pressure reader connected to the fourth piping configuration; and a compressor.

2. The apparatus of claim 1, wherein:

the third controller communicates with a fourth control valve, wherein the fourth control valve is located on a sixth piping configuration.

3. The apparatus of claim 2, wherein the first controller closes the first control valve when a pressure reading is below a particular threshold.

4. The apparatus of claim 1, further comprising:

a temperature reader.

5. The apparatus of claim 4, wherein the pressure reader sends pressure information to the third controller.

6. The apparatus of claim 5, wherein the pressure information includes information that gas pressure is above a particular threshold.

7. The apparatus of claim 5, wherein the pressure information includes information that gas pressure is below a particular threshold, and wherein the third controller keeps the third control valve open based on the pressure information being below the particular threshold.

8. The apparatus of claim 1, wherein the apparatus is moveable.

9. The apparatus of claim 1, further comprising:
a high-pressure accumulator.

10. The apparatus of claim 9, further comprising:
a mid-pressure accumulator, wherein:
the mid-pressure accumulator is connected to the first controller and the second controller.

11. A method for supplying gas, comprising:
connecting a fail-close valve to a first piping section;
connecting a first control valve to the first piping section;
connecting a safety valve to the first piping section, wherein the first control valve is located between to the safety valve and the fail-close valve;
connecting the first control valve to a first controller;
sending gas through the fail-close valve, wherein the gas sent through the fail-close valve is first sent through a high-pressure accumulator;
sending the gas through the control valve, wherein the gas is sent through the fail-close valve prior to the gas being sent to the first control valve;
controlling, by the first controller, a quantity of gas sent through the first control valve;
sending the gas to an indirect heater;
heating, by the indirect heater, the gas;
sending the gas through a pressure reader after the gas is heated;
sending pressure information of the heated gas from the pressure reader to a second controller; and
controlling a second control valve based on the pressure information sent to the second controller, wherein the second valve is connected to a third piping section that is connected to a compressor; and
supplying the gas to a gas system.

12. The method of claim 11, wherein the second controller controls the amount of the gas sent to the compressor.

13. The method of claim 12, further comprising:
turning the compressor on based on a position of the second control valve that is based on the pressure information sent to the second controller.

14. The method of claim 13, further comprising:
compressing the gas by the compressor, wherein the gas enters the high-pressure accumulator before entering the compressor.

15. The method of claim 14, wherein a fiscal analyzer is placed between the compressor and a gas analyzer.

16. The method of claim 12, further comprising:
sending the gas to a fourth piping section instead of the first piping section, wherein the fourth piping section includes:
another fail-close valve,
a third control valve, and
another safety valve,
wherein the other fail-close valve, the third control valve, and the other safety valve provides 100% redundancy if at least one of the fail-close valve, the second control valve, and the safety valve fails.

17. The method of claim 16, wherein the gas is heated by another indirect heater prior to sending the gas to the fail-close valve.

18. The method of claim 16, further comprising:
opening, by a third controller, the third control valve, based on the third controller receiving a first pressure information, wherein only the third controller or the first controller operates at one time.

19. The method of claim 16, wherein, prior to receiving the first pressure information, the third controller receives initial pressure information from a mid-pressure accumulator.

* * * * *